US012693404B2

(12) United States Patent
Chang

(10) Patent No.: US 12,693,404 B2
(45) Date of Patent: Jul. 28, 2026

(54) RADAR SCANNING SYSTEM AND SCANNING METHOD

(71) Applicant: Wistron Corporation, New Taipei City (TW)

(72) Inventor: Yao-Tsung Chang, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 407 days.

(21) Appl. No.: 17/948,278

(22) Filed: Sep. 20, 2022

(65) Prior Publication Data

US 2023/0408675 A1 Dec. 21, 2023

(30) Foreign Application Priority Data

May 25, 2022 (TW) .................................. 111119559

(51) Int. Cl.
| | |
|---|---|
| *G01S 13/72* | (2006.01) |
| *G01S 7/35* | (2006.01) |
| *G01S 13/58* | (2006.01) |
| *G01S 13/62* | (2006.01) |

(52) U.S. Cl.
CPC ............ *G01S 13/726* (2013.01); *G01S 7/356* (2021.05); *G01S 13/584* (2013.01); *G01S 13/62* (2013.01)

(58) Field of Classification Search
CPC .... G01S 13/426; G01S 13/726; G01S 13/584; G01S 13/62
See application file for complete search history.

(56) References Cited

U.S. PATENT DOCUMENTS

| | | | | |
|---|---|---|---|---|
| 9,229,102 B1 * | 1/2016 | Wright | ................. | G01S 13/885 |
| 2018/0348343 A1 * | 12/2018 | Achour | ................. | H01Q 1/364 |
| 2019/0064810 A1 * | 2/2019 | Jiang | ...................... | G06V 20/56 |
| 2020/0241122 A1 * | 7/2020 | Achour | ................. | G01S 13/931 |
| 2021/0156984 A1 * | 5/2021 | Campbell | ............ | H01Q 1/3233 |
| 2023/0103178 A1 * | 3/2023 | Li | .......................... | G01S 13/931 |
| | | | | 701/23 |
| 2023/0139751 A1 * | 5/2023 | Sanderovich | ........... | G01S 13/89 |
| | | | | 382/103 |
| 2024/0319323 A1 * | 9/2024 | Shalita | .................... | G01S 13/89 |

* cited by examiner

*Primary Examiner* — Resha Desai
*Assistant Examiner* — Peter Davon Doze
(74) *Attorney, Agent, or Firm* — McClure, Qualey & Rodack, LLP

(57) ABSTRACT

A radar scanning system and a scanning method are provided. The processing unit of the radar scanning system is configured to perform the following steps in a scanning round: sending a control signal to cause the radar unit to scan a plurality of predetermined fields of view of the radar unit, and recording, in response to finding a tracked object in the predetermined fields of view through scanning, coordinates of each tracked object and setting a preferential field of view, based on the coordinates of the each tracked object; and creating a scan list, setting, in response to finding the tracked object in the predetermined fields of view, the scan list to include the preferential field of view, and controlling, based on the scan list and a scanning and processing policy, the radar unit to perform scanning.

20 Claims, 19 Drawing Sheets

101

105

1300

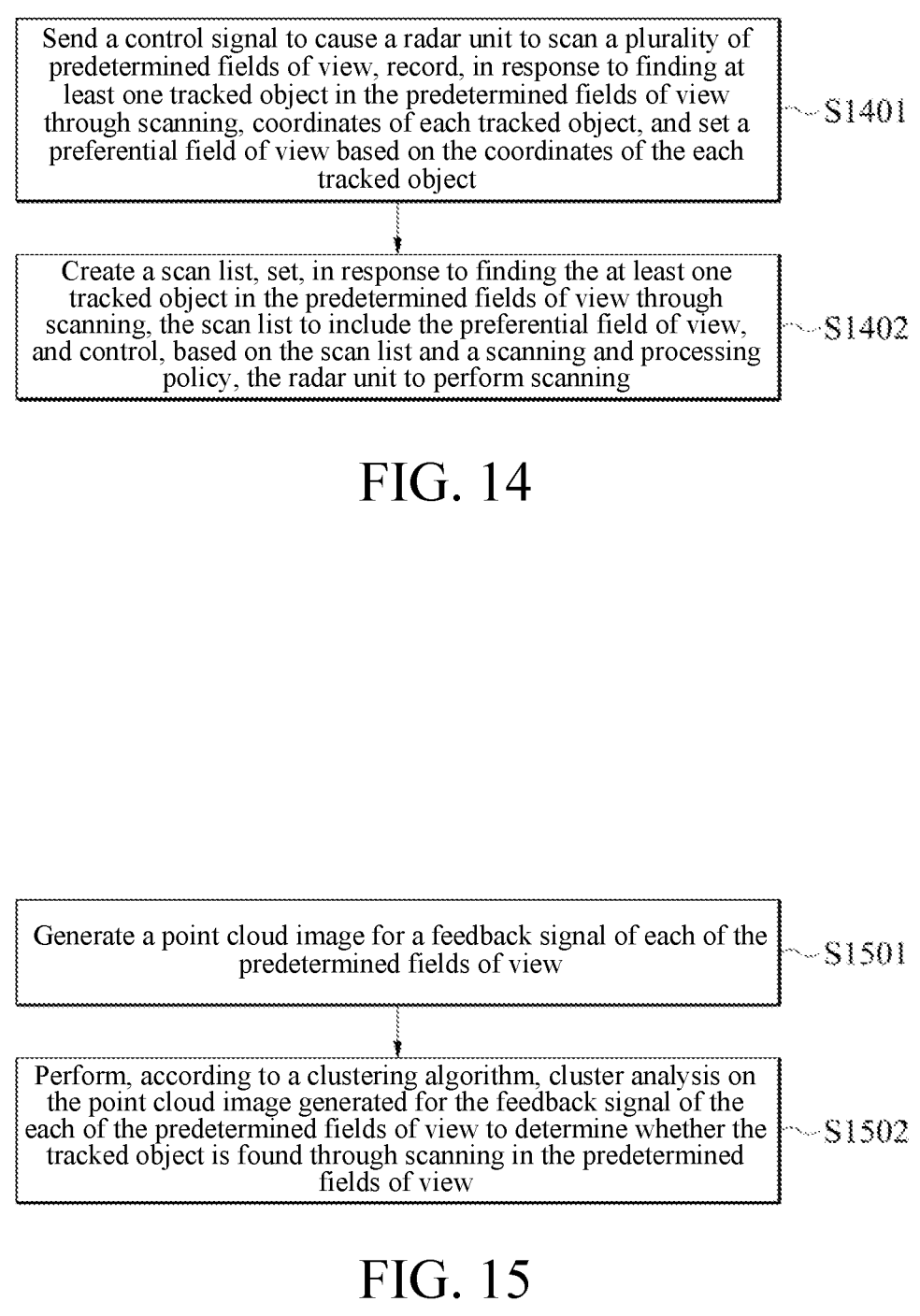

Send a control signal to cause a radar unit to scan a plurality of predetermined fields of view, record, in response to finding at least one tracked object in the predetermined fields of view through scanning, coordinates of each tracked object, and set a preferential field of view based on the coordinates of the each tracked object     ~S1401

Create a scan list, set, in response to finding the at least one tracked object in the predetermined fields of view through scanning, the scan list to include the preferential field of view, and control, based on the scan list and a scanning and processing policy, the radar unit to perform scanning     ~S1402

FIG. 14

Generate a point cloud image for a feedback signal of each of the predetermined fields of view     ~S1501

Perform, according to a clustering algorithm, cluster analysis on the point cloud image generated for the feedback signal of the each of the predetermined fields of view to determine whether the tracked object is found through scanning in the predetermined fields of view     ~S1502

FIG. 15

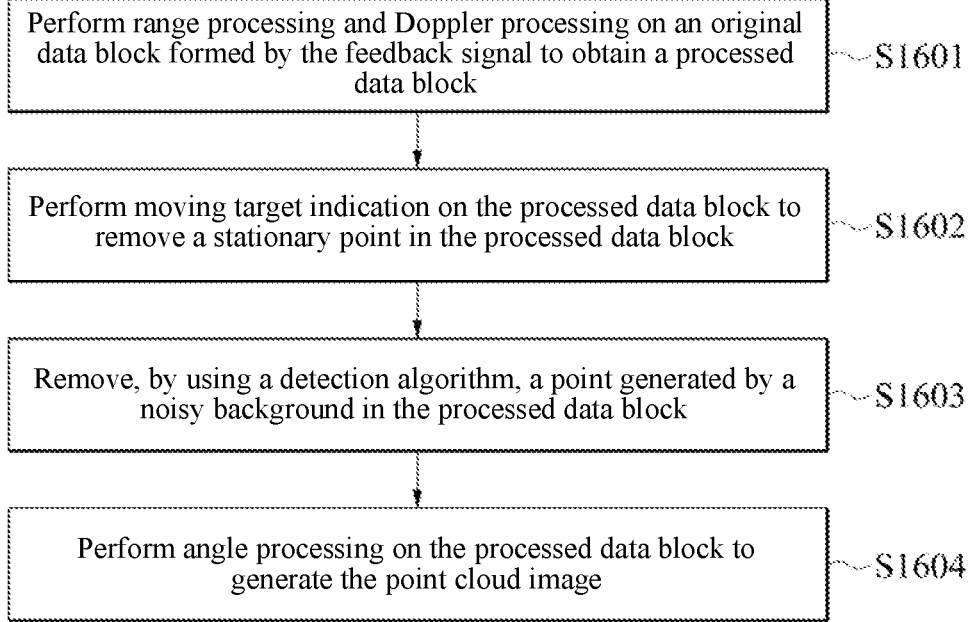

Perform range processing and Doppler processing on an original data block formed by the feedback signal to obtain a processed data block ~S1601

Perform moving target indication on the processed data block to remove a stationary point in the processed data block ~S1602

Remove, by using a detection algorithm, a point generated by a noisy background in the processed data block ~S1603

Perform angle processing on the processed data block to generate the point cloud image ~S1604

FIG. 16

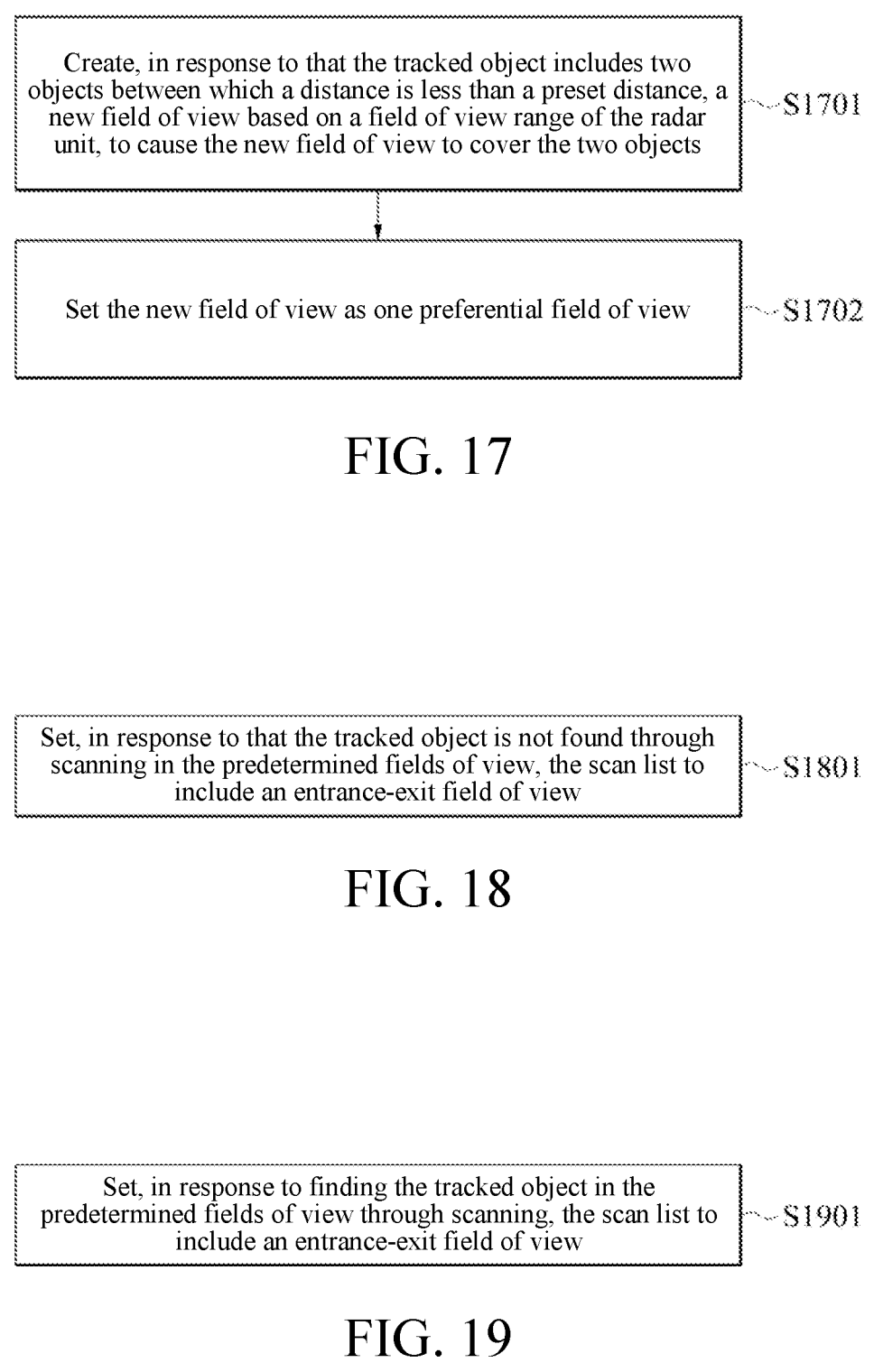

Create, in response to that the tracked object includes two objects between which a distance is less than a preset distance, a new field of view based on a field of view range of the radar unit, to cause the new field of view to cover the two objects ~S1701

Set the new field of view as one preferential field of view ~S1702

FIG. 17

Set, in response to that the tracked object is not found through scanning in the predetermined fields of view, the scan list to include an entrance-exit field of view ~S1801

FIG. 18

Set, in response to finding the tracked object in the predetermined fields of view through scanning, the scan list to include an entrance-exit field of view ~S1901

FIG. 19

RADAR SCANNING SYSTEM AND SCANNING METHOD

CROSS-REFERENCE TO RELATED APPLICATION

This non-provisional application claims priority under 35 U.S.C. § 119(a) to Patent Application No. 111119559 filed in Taiwan, R.O.C. on May 25, 2022, the entire contents of which are hereby incorporated by reference.

BACKGROUND

Technical Field

The present invention relates to the field of radar scanning, and in particular, to a technology of using a frequency-modulated continuous wave signal and an algorithm in the field of radar scanning.

Related Art

In recent years, with the vigorous development of the radar detection technology, related technologies have been gradually applied to patient care, long-term care of the elderly, and infant care. For ordinary infants, bedridden patients, or the elderly, the radar only needs to detect the region on the bed, and a radar with a fixed pointing region can be used. However, if a plurality of target objects need to be detected, a common directional antenna may encounter a case in which the field of view is insufficient, that is, a case in which some objects are out of a field of view range, or the antenna is designed to have a wide-angle field of view without a sufficient resolution.

SUMMARY

In view of this, some embodiments of the present invention provide a radar scanning system, a scanning method, a computer-readable recording medium storing a program, and a non-transitory computer program product, to alleviate the problems in the prior art.

Some embodiments of the present invention provide a radar scanning system. The radar scanning system includes a radar unit and a processing unit. The radar unit is configured to generate a radio frequency signal, radiate the radio frequency signal to a field of view of the radar unit, and receive a feedback signal to scan the field of view. The processing unit is configured to perform the following steps in a scanning round: sending a control signal to cause the radar unit to scan a plurality of predetermined fields of view of the radar unit; recording, by the radar unit in response to finding a tracked object in the predetermined fields of view through scanning, coordinates of each tracked object; setting, by the radar unit, a preferential field of view based on the coordinates of the each tracked object; and creating a scan list, setting, by the radar unit in response to finding the tracked object in the predetermined fields of view through scanning, the scan list to include the preferential field of view, and controlling, based on the scan list and a scanning and processing policy, the radar unit to perform scanning.

Some embodiments of the present invention provide a scanning method, executable by a processing unit. The scanning method includes performing the following steps in a scanning round: sending a control signal to cause the radar unit to scan a plurality of predetermined fields of view of the radar unit, and recording, in response to finding a tracked object in the predetermined fields of view through scanning, coordinates of each tracked object, and setting a preferential field of view based on the coordinates of the each tracked object; and creating a scan list, setting, in response to finding the tracked object in the predetermined fields of view through scanning, the scan list to include the preferential field of view, and controlling, based on the scan list and a scanning and processing policy, the radar unit to perform scanning.

Some embodiments of the present invention provide a computer-readable recording medium storing a program and a non-transitory computer program product. After loading and executing the program, the processor can complete the foregoing scanning method.

Based on the above, some embodiments of the present invention provide the radar scanning system, the scanning method, the computer-readable recording medium storing a program, and the non-transitory computer program product, to expand a detection range of the radar unit by integrating a plurality of fields of view of the radar unit, and improve a detection efficiency of the radar unit by scanning a specific region at a high frequency.

BRIEF DESCRIPTION OF THE DRAWINGS

FIG. 4-1 illustrates a schematic diagram of adjusting a field of view direction according to an embodiment of the present invention.

FIG. 4-2 illustrates a schematic diagram of adjusting a field of view direction according to an embodiment of the present invention.

FIG. 4-3 illustrates a schematic diagram of adjusting a field of view direction according to an embodiment of the present invention.

FIG. 5-1 illustrates a schematic diagram of operation of a radar scanning system according to some embodiments of the present invention.

FIG. 5-2 illustrates a schematic diagram of operation of a radar scanning system according to some embodiments of the present invention.

FIG. 5-3 illustrates a schematic diagram of operation of a radar scanning system according to some embodiments of the present invention.

FIG. 14 illustrates a flowchart of a scanning method according to some embodiments of the present invention.

FIG. 15 illustrates a flowchart of a scanning method according to some embodiments of the present invention.

FIG. 16 illustrates a flowchart of generating a point cloud image according to an embodiment of the present invention.

FIG. 17 illustrates a flowchart of a scanning method according to some embodiments of the present invention.

FIG. 18 illustrates a flowchart of a scanning method according to some embodiments of the present invention.

FIG. 19 illustrates a flowchart of a scanning method according to some embodiments of the present invention.

DETAILED DESCRIPTION

Figure 1:
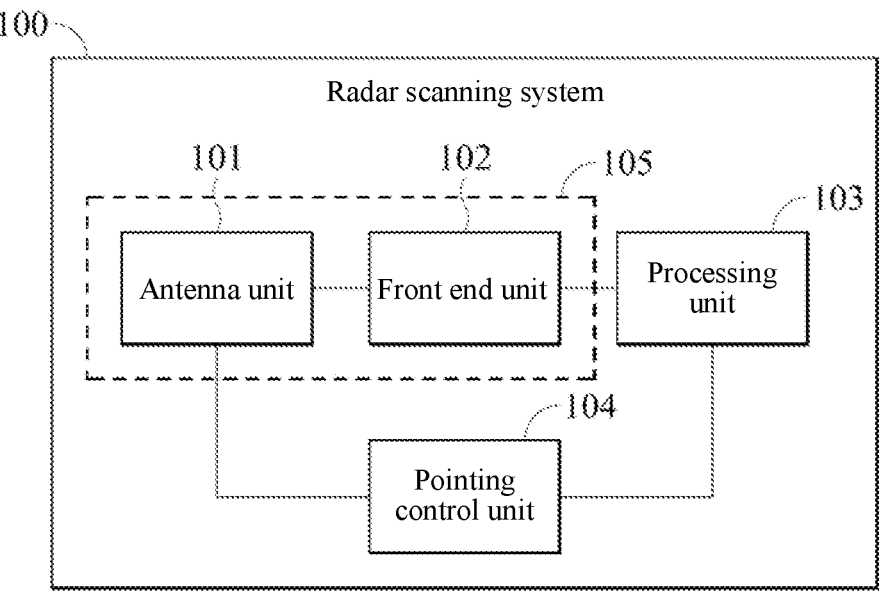
FIG. 1 illustrates a block diagram of a radar scanning system according to an embodiment of the present invention.

The foregoing and other technical contents, features, and effects of the present invention will be clearly presented in the following detailed descriptions of the embodiments with reference to the drawings. The thicknesses or sizes of the elements in the drawings expressed in an exaggerated, omitted, or general manner are used for a person skilled in the art to understand and read, and the sizes of the elements are not all actual sizes thereof and are not intended to limit restraint conditions under which the present invention can be implemented and therefore, have no technical significance. Any modification to the structure, change to the proportional relationship, or adjustment on the size should fall within the scope of the technical content disclosed by the present invention without affecting the effects and the objectives that can be achieved by the present invention. The same reference numerals are used to indicate the same or similar elements in all of the drawings. The term "couple" provided in the following embodiments may refer to any direct or indirect connection means.

FIG. 1 illustrates a block diagram of a radar scanning system according to an embodiment of the present invention. Referring to FIG. 1, a radar scanning system 100 includes a radar unit 105, a processing unit 103, and a pointing control unit 104. The radar unit 105 includes an antenna unit 101 and a front end unit 102. The antenna unit 101 is configured to radiate a radio frequency signal to free space. A feedback signal is reflected when the radio frequency signal collides with an object in the free space. The antenna unit 101 receives the feedback signal of the radio frequency signal. The front end unit 102 is configured to generate the foregoing radio frequency signal, and demodulate and digitize the foregoing feedback signal to obtain a digital feedback signal. The pointing control unit 104 is configured to adjust a field of view (FOV) direction of the radar unit 105 according to a control signal. The processing unit 103 is configured to receive the foregoing digital feedback signal and send the control signal to the pointing control unit 104. The field of view direction of the foregoing radar unit 105 refers to a direction of a center of the detectable range of the radar unit 105.

In some embodiments of the present invention, the foregoing radio frequency signal is a continuous wave (CW) signal. In some embodiments of the present invention, the foregoing radio frequency signal is a frequency-modulated continuous wave (FMCW) signal. In some embodiments of the present invention, the foregoing radio frequency signal is a frequency-fixed continuous wave signal.

Figure 2:
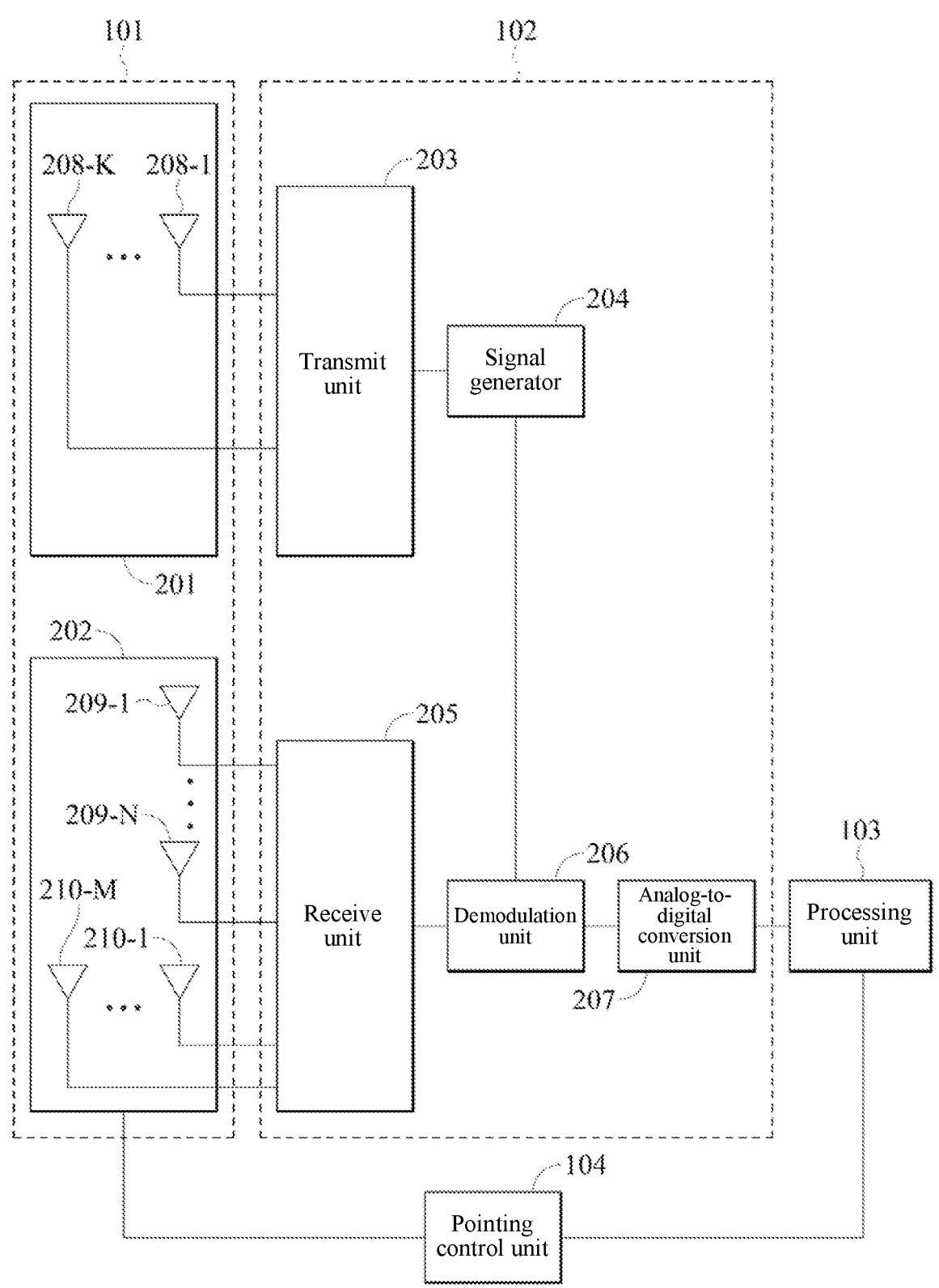
FIG. 2 illustrates a schematic diagram of a radar scanning system according to an embodiment of the present invention.

FIG. 2 illustrates a schematic diagram of a radar scanning system according to an embodiment of the present invention. Referring to FIG. 2, the foregoing antenna unit 101 further includes a transmit antenna unit 201 and a receive antenna unit 202. The transmit antenna unit 201 includes a plurality of transmit antennas 208-1 to 208-K. The transmit antennas 208-1 to 208-K radiate the foregoing radio frequency signal to the free space. The receive antenna unit 202 includes a plurality of receive antennas 209-1 to 209-N and 210-1 to 210-M to receive the feedback signal. K, N, and M are positive integers, and represent configured quantities of the transmit antennas 208-1 to 208-K, the receive antennas 209-1 to 209-N, and the receive antennas 210-1 to 210-M. The actual quantities depend on the requirements of the radar scanning system 100 and are not limited in the present invention.

Generally, for the design of the transmit antenna, the antenna design needs to be determined by taking the frequency of the signal, the field of view, and the objective into account. The antenna may be designed as a lens antenna, a patch antenna, or a waveguide leaky-wave antenna. In some embodiments of the present invention, the transmit antennas 208-1 to 208-K are patch antennas.

Generally, for the design of the receive antenna, the antenna design needs to be determined by taking the frequency of the received signal into account. To identify the direction of an object, a plurality of receive antennas are needed. The receive antenna usually includes a plurality of beams to receive echoes of the object at different azimuth angles, and determine an orientation of the object accordingly. For the design of the receive antenna, the frequency range of the received radio frequency signal and whether the direction of the to-be-detected object needs to be identified are taken into account. If the direction needs to be identified, the design of a single input multiple output (SIMO) antenna or the design of a multiple input multiple output (MIMO) antenna needs to be taken into account. In some embodiments of the present invention, the receive antennas 209-1 to 209-N and 210-1 to 210-M are patch antennas, and a printed circuit board is used to implement the antennas.

The front end unit 102 includes a signal generator 204, a transmit unit 203, a receive unit 205, a demodulation unit 206 and an analog-to-digital converter 207. The signal generator 204 generates a radio frequency signal, and sends the radio frequency signal to the transmit unit 203 and the demodulation unit 206 at the same time. The transmit unit 203 includes a power amplifier (PA), configured to amplify the radio frequency signal and transmit the amplified radio frequency signal to the transmit antenna unit 201 so that a frequency-modulated signal is radiated to the free space.

The receive unit 205 includes a signal amplifier and a filter, and is configured to receive the feedback signal received by the receive antenna unit 101 and amplify and filter the received feedback signal. The demodulation unit 206 is coupled to the signal generator 204 and the receive unit 205. The demodulation unit 206 receives the radio frequency signal generated by the signal generator 204 and the feedback signal amplified and filtered by the receive unit 205, and demodulates the amplified and filtered feedback signal based on the radio frequency signal. The analog-todigital converter 207 converts the demodulated feedback signal into a digital feedback signal and transmits the digital feedback signal to the processing unit 103 for subsequent signal processing.

In some embodiments of the present invention, the signal generator 204 generates a linear frequency modulation signal with a start frequency of 77 GHz, a stop frequency of 81 GHz, and a time cycle Tc of 40 μs. In some embodiments of the present invention, the signal generator 204 generates a linear frequency modulation signal with a start frequency of 24 GHz, a stop frequency of 28 GHz, and a time cycle Tc of 40 μs. The position and speed of an object, or even the breathing and heartbeats of the object can be detected by using the linear frequency modulation signal and further performing appropriate fast Fourier transform (FFT) signal processing. In this embodiment, the demodulation unit 206 mixes and merges the frequency-modulated signal generated by the signal generator 204 and the feedback signal amplified and filtered by the receive unit 205 and filters out a high frequency signal, to generate an intermediate frequency signal. The analog-to-digital converter 207 converts the intermediate frequency signal into a digital feedback signal and transmits the digital feedback signal to the processing unit 103 for subsequent signal processing, so that information included in the feedback signal is obtained.

In some embodiments of the present invention, the signal generator 204 generates a single-frequency continuous wave signal. The breathing, heartbeats, and the like of the object can be detected by using the single-frequency continuous wave signal and then through the Doppler fast Fourier transform. The direction of the object can be detected by using the plurality of transmit antennas 208-1 to 208-K and a plurality of receive antennas 209-1 to 209-N and 210-1 to 210-M at the same time.

In some embodiments of the present invention, the pointing control unit 104 includes a horizontal direction adjustment drive circuit, a vertical direction adjustment drive circuit, a horizontal direction adjustment mechanism, a vertical direction adjustment mechanism, and a pointing sensor. The pointing control unit 104 controls, according to an instruction of the processing unit 103, a field of view direction of the radar unit 105 to adjust a horizontal direction and/or adjust a vertical direction. The pointing control unit 104 drives the horizontal direction adjustment mechanism and the vertical direction adjustment mechanism by using the horizontal direction adjustment drive circuit and the vertical direction adjustment drive circuit to control the field of view direction of the radar unit 105. The horizontal direction adjustment mechanism and the vertical direction adjustment mechanism each include a motor, a related mechanism, and an electronic motor component. The foregoing motor may be a stepping motor or a servo motor, which is not limited in the present invention. The pointing sensor reports back the field of view direction of the radar unit 105. In this embodiment, the pointing sensor indicates the field of view direction of the radar unit 105 by using a horizontal angle and vertical angle group. The pointing control unit 104 determines, according to the foregoing horizontal angle and vertical angle group, whether the pointing instruction of the processing unit 103 is completed. It should also be noted that if the field of view of the radar unit 105 is plus or minus 60° horizontally and plus or minus 60° vertically, to expand the field of view of the radar unit 105 to plus or minus 90° horizontally and plus or minus 90° vertically, it is required that the pointing control unit 104 can adjust field of view direction of the radar unit 105 by plus or minus 30° horizontally and plus or minus 30° vertically.

It should be noted that because the field of view direction of the radar unit 105 can be controlled by the pointing control unit 104, the detectable range of the radar unit 105 is enlarged. In the present invention, a current field of view of the radar unit 105 is referred to as a current field of view (current FOV). A detection range that can be achieved by controlling the field of view direction of the radar unit 105 is referred to as a total field of view (total FOV). An example in which the field of view of the radar unit 105 is plus or minus 60° horizontally and plus or minus 60° vertically, and the field of view of the radar unit 105 is expanded to plus or minus 90° horizontally and plus or minus 90° vertically by controlling field of view direction of the radar unit 105, the total field of view of the radar unit 105 is plus or minus 90° horizontally and plus or minus 90° vertically. A current field of view of the radar unit 105 is plus or minus 60° horizontally and plus or minus 60° vertically. A current field of view of another radar unit 105 is plus or minus 60° horizontally and plus or minus 30° to 90° vertically.

Figure 3:
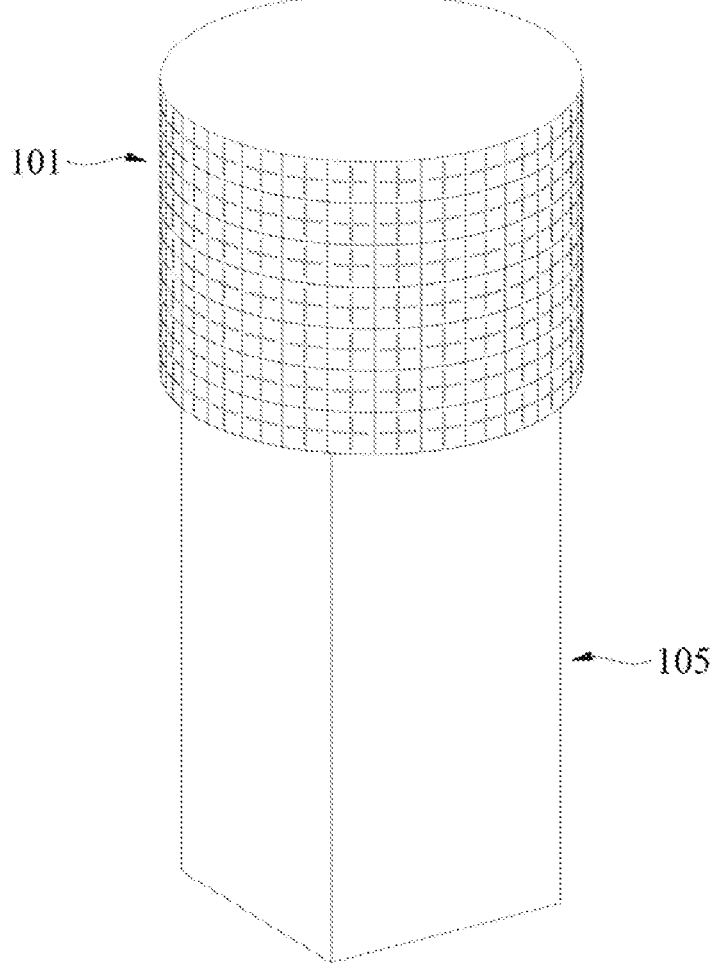
FIG. 3 illustrates a schematic diagram of a radar scanning system according to an embodiment of the present invention.
Figures 2, 4:
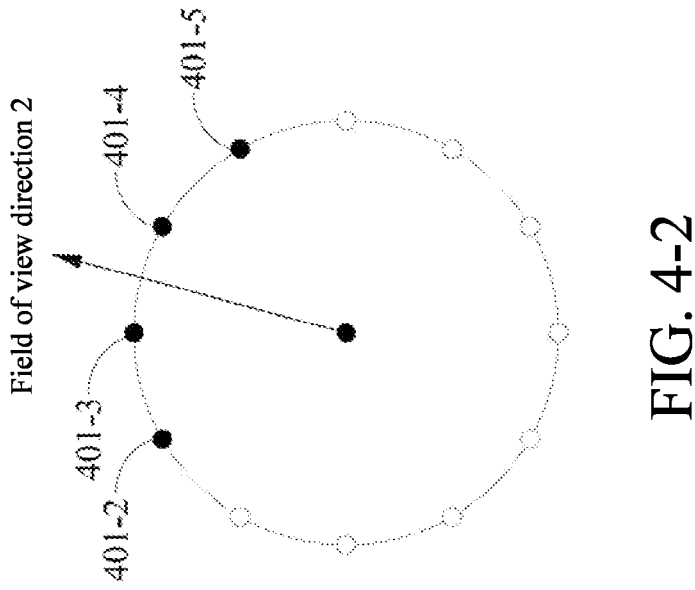
Figures 1, 4:
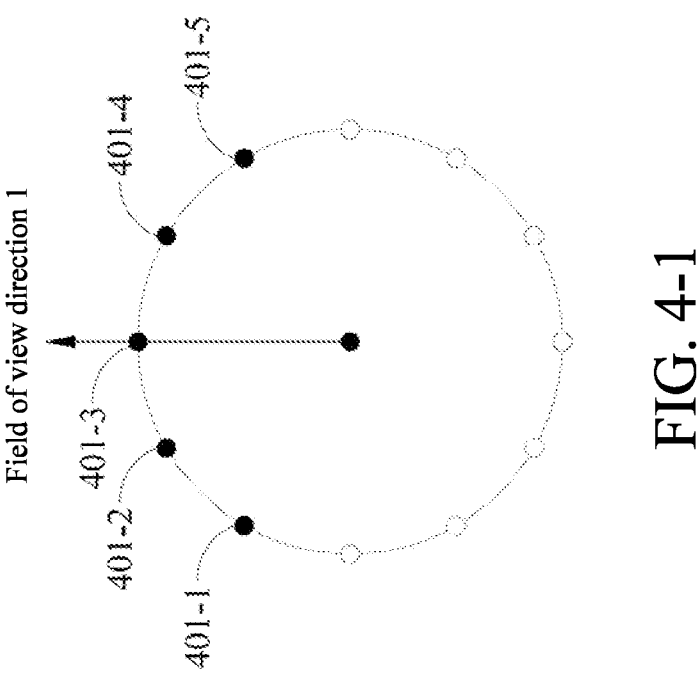
Figures 3, 4:
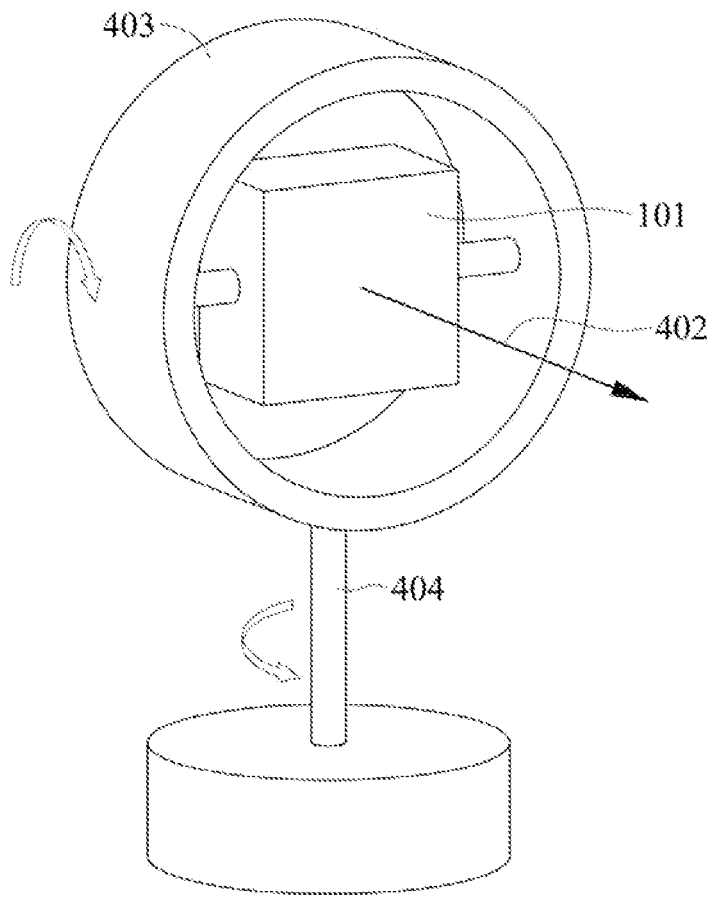

FIG. 3 illustrates a schematic diagram of a radar scanning system according to an embodiment of the present invention. FIG. 4-1 and FIG. 4-2 illustrate schematic diagrams of adjusting a field of view direction according to an embodiment of the present invention. Refer to FIG. 3, FIG. 4-1, and FIG. 4-2 together. As shown in FIG. 3, the radar unit 105 is a multi-directional antenna group (such as a four-sided antenna group, a six-sided antenna group, or an eight-sided antenna group), and the antenna unit 101 includes a plurality of looped antenna groups (as shown in FIG. 3). In the structure shown in FIG. 3, the pointing control unit 104 can adjust the field of view direction of the radar unit 105 by choosing to switch to an antenna group corresponding to a desired field of view. The field of view direction of the radar unit 105 can be quickly adjusted by using the structure shown in FIG. 3 because no electromechanical driving structure is used. As shown in FIG. 4-1 and FIG. 4-2, when the pointing control unit 104 selects the antenna groups 401-1 to 401-5, the field of view direction of the radar unit 105 is a field of view direction 1. When the pointing control unit 104 selects the antenna groups 401-2 to 401-5, the field of view direction of the radar unit 105 is a field of view direction 2.

FIG. 4-3 illustrates a schematic diagram of adjusting a field of view direction according to an embodiment of the present invention. The pointing control unit 104 performs horizontal pointing control and vertical pointing control on the horizontal direction adjustment mechanism 404 and the vertical direction adjustment mechanism 403 by using the horizontal direction adjustment drive circuit and the vertical direction adjustment drive circuit, and adjusts the direction of the antenna unit 101 to control a field of view direction 402 of the radar unit 105. The horizontal direction adjustment mechanism 404 and the vertical direction adjustment mechanism 403 each include a motor, a related mechanism, and an electronic motor component. It should be noted that, in this embodiment, when the pointing control unit 104 adjusts the field of view direction 402 of the radar unit 105, the field of view direction 402 is maintained pointing to a center point of the field of view of the radar unit 105.

Figure 6:
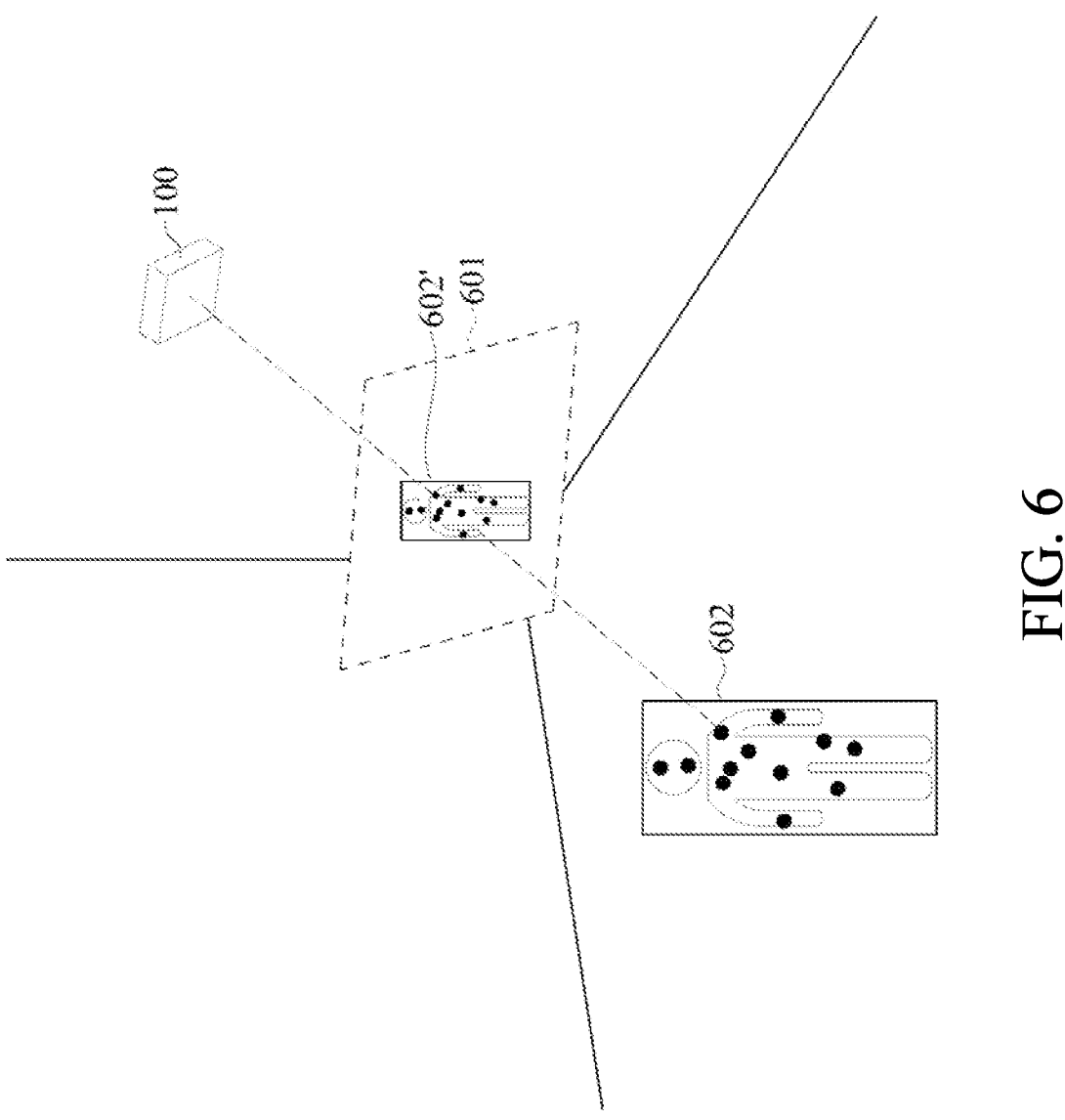
FIG. 6 illustrates a schematic diagram of a current field of view and a current field of view coordinate system according to an embodiment of the present invention.
Figure 7:
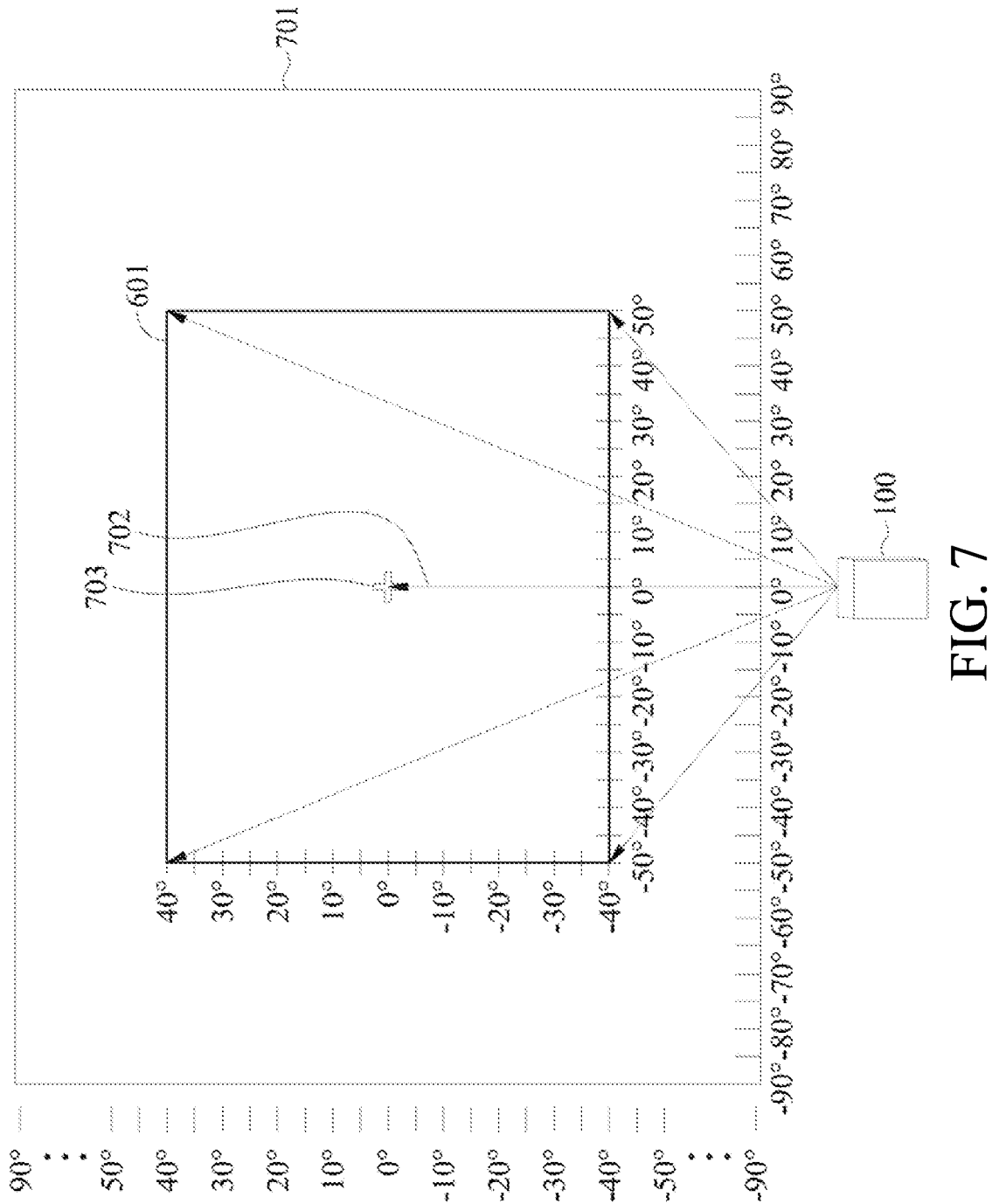
FIG. 7 illustrates a schematic diagram of a current field of view, a total field of view, and a current field of view coordinate system according to an embodiment of the present invention.

FIG. 6 illustrates a schematic diagram of a current field of view and a current field of view coordinate system according to an embodiment of the present invention. FIG. 7 illustrates a schematic diagram of a current field of view, a total field of view, and a current field of view coordinate system according to an embodiment of the present invention. Referring to FIG. 6 and FIG. 7 together, by projecting an object (an object 602) detected in a current field of view of the radar unit 105 of the radar scanning system 100 onto a plane 601 (an object projection 602') corresponding to the current field of view, a two-dimensional coordinate system may be given to the detected object in the current field of view of the radar unit 105, and is referred to as a current field of view coordinate system. Using FIG. 7 as an example, the plane 601 corresponding to the current field of view can define a two-dimensional coordinate system by using angles. A first-dimension coordinate is a horizontal angle with a range of plus or minus 50°. A second-dimension coordinate is a vertical angle with a range of plus or minus 40°. A field of view direction 702 corresponds to an origin 703 of the current field of view coordinate system.

As shown in FIG. 7, the total field of view obtained by controlling the field of view direction of the radar unit 105 can also define a corresponding total field of view coordinate system 701 by using angles. A first-dimension coordinate of the total field of view coordinate system 701 is a horizontal angle with a range of plus or minus 90°. A second-dimension coordinate is a vertical angle with a range of plus or minus 90°. The current field of view coordinate and the total field of view coordinate system 701 can be easily converted provided that a coordinate position of the origin 703 of the current field of view coordinate system corresponding to the plane 601 of the current field of view in the total field of view coordinate system 701 is known.

Figure 8:
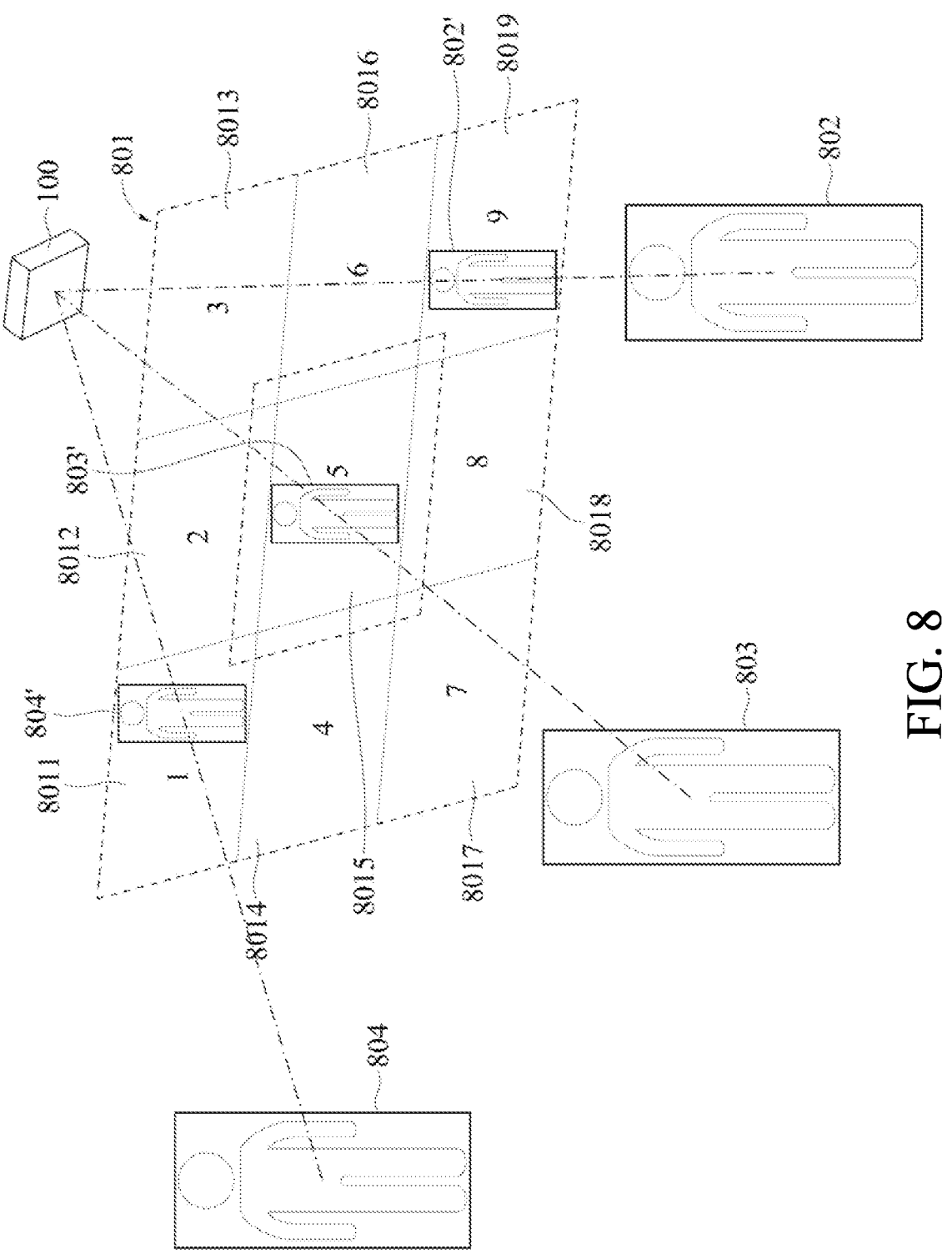
FIG. 8 illustrates a schematic diagram of a predetermined field of view and a total field of view according to an embodiment of the present invention.
Figure 9:
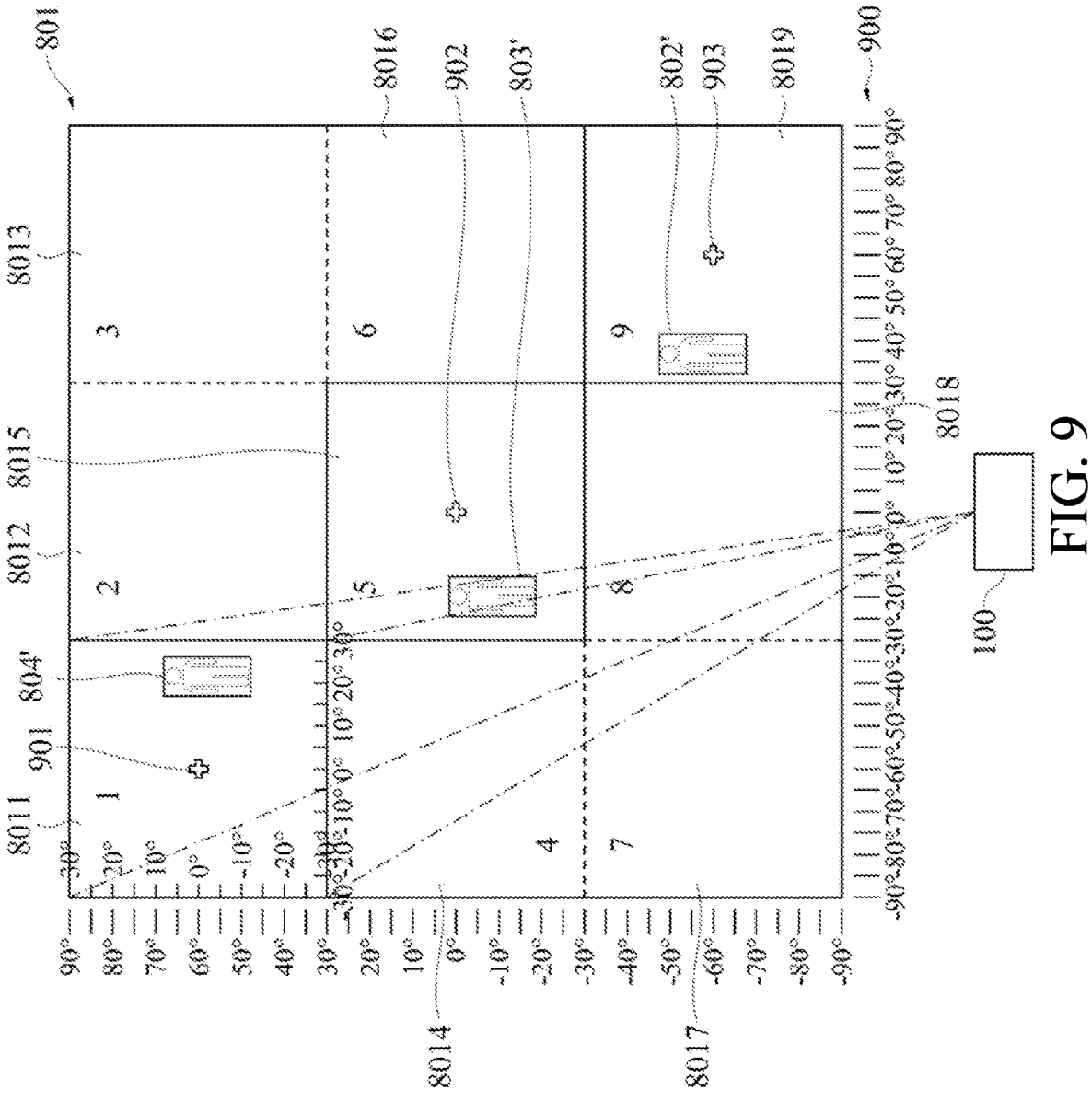
FIG. 9 illustrates a schematic diagram of a predetermined field of view coordinate system and a total field of view coordinate system according to an embodiment of the present invention.

FIG. 8 illustrates a schematic diagram of a predetermined field of view and a total field of view according to an embodiment of the present invention. FIG. 9 illustrates a schematic diagram of a predetermined field of view coordinate system and a total field of view coordinate system according to an embodiment of the present invention. In the embodiments shown in FIG. 8 and FIG. 9, the field of view of the radar unit 105 is plus or minus 30° horizontally and plus or minus 30° vertically. Referring to FIG. 8, in this embodiment, the pointing control unit 104 controls the field of view direction of the radar unit 105 for perform scanning in nine directions, so there are nine corresponding current fields of view. By selecting a plane 8011, a plane 8012, a plane 8013, a plane 8014, a plane 8015, a plane 8016, a plane 8017, a plane 8018, and a plane 8019 corresponding to the current fields of view and the field of view of the radar unit 105 (plus or minus 30° horizontally and plus or minus 30° vertically), a current of view coordinate system can be given to each current field of view of the radar unit 105. The first-dimension coordinate of the each current field of view coordinate system is a horizontal angle with a range of plus or minus 30°; and the second-dimension coordinate of the each current field of view coordinate system is a vertical angle with a range of plus or minus 30°. The current field of view coordinate systems are numbered 1 to 9.

The foregoing nine current fields of view constitute a total field of view of the radar unit 105. A plane 801 is a set including the plane 8011, the plane 8012, the plane 8013, the plane 8014, the plane 8015, the plane 8016, the plane 8017, the plane 8018, and the plane 8019. By using the plane 801 and the field of view of the foregoing radar unit 105 (plus or minus 30° horizontally and plus or minus 30° vertically), a total field of view coordinate system 900 on the total field of view can be defined. The first-dimension coordinate of the total field of view coordinate system 900 is a horizontal angle with a range of plus or minus and the second-dimension coordinate of the total field of view coordinate system 900 is a vertical angle with a range of plus or minus 90°. Projecting an object detected in each current field of view of the radar unit 105 of the radar scanning system 100 onto the plane corresponding to the current field of view can give a two-dimensional coordinate system corresponding to the current field of view coordinate system to the object in detected in the current field of view. Using FIG. 8 and FIG. 9 as examples, the object 804 is projected onto the plane 8011 (an object projection 804'), the object 803 is projected onto the plane 8015 (an object projection 803'), and the object 802 is projected onto the plane 8019 (an object projection 802'). The object 804, the object 803, and the object 802 each have two-dimensional coordinates in their respective current field of view coordinate systems.

In addition, the current field of view coordinate systems 1 to 9 and the total field of view coordinate system 900 can be easily converted provided that coordinate positions of center points of the plane 8011, the plane 8012, the plane 8013, the plane 8014, the plane 8015, the plane 8016, the plane 8017, the plane 8018 and the plane 8019 corresponding to the current fields of view in the total field of view coordinate system 900 are known.

Using FIG. 8 and FIG. 9 as examples, the object 804 is projected onto the plane 8011 (an object projection 804'), and the object 804 has coordinates (20°, 0°) in the current field of view coordinate system 1. The coordinates of the center point 901 of the plane 8011 in the total field of view coordinate system 900 are (−60°,60°), so that the coordinates (−40°, 60°) of the object 804 in the total field of view coordinate system 900 can be easily obtained through conversion. Based on the same principle, the coordinates of the object 803 and the object 802 in the total field of view coordinate system 900 can be obtained by using the coordinate positions of the center point 902 of the plane 8015 and the center point 903 of the plane 8019 in the total field of view coordinate system 900.

The scanning method according to the embodiments of the present invention and how modules of the radar scanning system 100 cooperate to operate are described below in detail with reference to the drawings.

FIG. 5-1 FIG. 5-2 and FIG. 5-3 illustrate schematic diagrams of operation of a radar scanning system 100 according to some embodiments of the present invention. FIG. 14 illustrates a flowchart of a scanning method according to some embodiments of the present invention. Referring to FIG. 5-1, FIG. 5-2, FIG. 5-3, and FIG. 14 together, the radar scanning system 100 repeatedly radiates a radio frequency signal to scan a plurality of predetermined fields of view (a schematic diagram 504 of a predetermined field of view in FIG. 5-1), and obtain a feedback signal, where the radio frequency signal is the foregoing linear frequency modulation signal. The processing unit 103 scans the plurality of predetermined fields of view, and performs steps S1401 to S1402 in one scanning round. In step S1401, the processing unit 103 sends a control signal to cause the radar unit 105 to scan a plurality of predetermined fields of view. The processing unit 103 records, in response to finding a tracked object in the predetermined fields of view through scanning, coordinates of each tracked object, and sets a preferential field of view based on the coordinates of the each tracked object. In step S1402, the processing unit 103 creates a scan list. The processing unit 103 sets, in response to finding the tracked object in the predetermined fields of view through scanning, the scan list to include the preferential field of view based on the tracked object. The processing unit 103 controls, based on the scan list and the scanning and processing policy, the radar unit 105 to perform scanning.

Step S1401 and step S1402 are further described below with reference to some embodiments of the present invention.

FIG. 15 illustrates a flowchart of a scanning method according to some embodiments of the present invention. Referring to FIG. 15, in the embodiment shown in FIG. step S1401 further includes steps S1501 to S1502. In step S1501, the processing unit 103 generates a point cloud image 500 based on the feedback signal of the predetermined field of view currently being scanned. The point cloud image 500 includes a plurality of points 501. In step S1502, the processing unit 103 performs cluster analysis on the point cloud image 500 according to a clustering algorithm to classify the plurality of points 501 into at least one object cluster corresponding to the predetermined field of view currently being scanned.

Figures 1, 5:
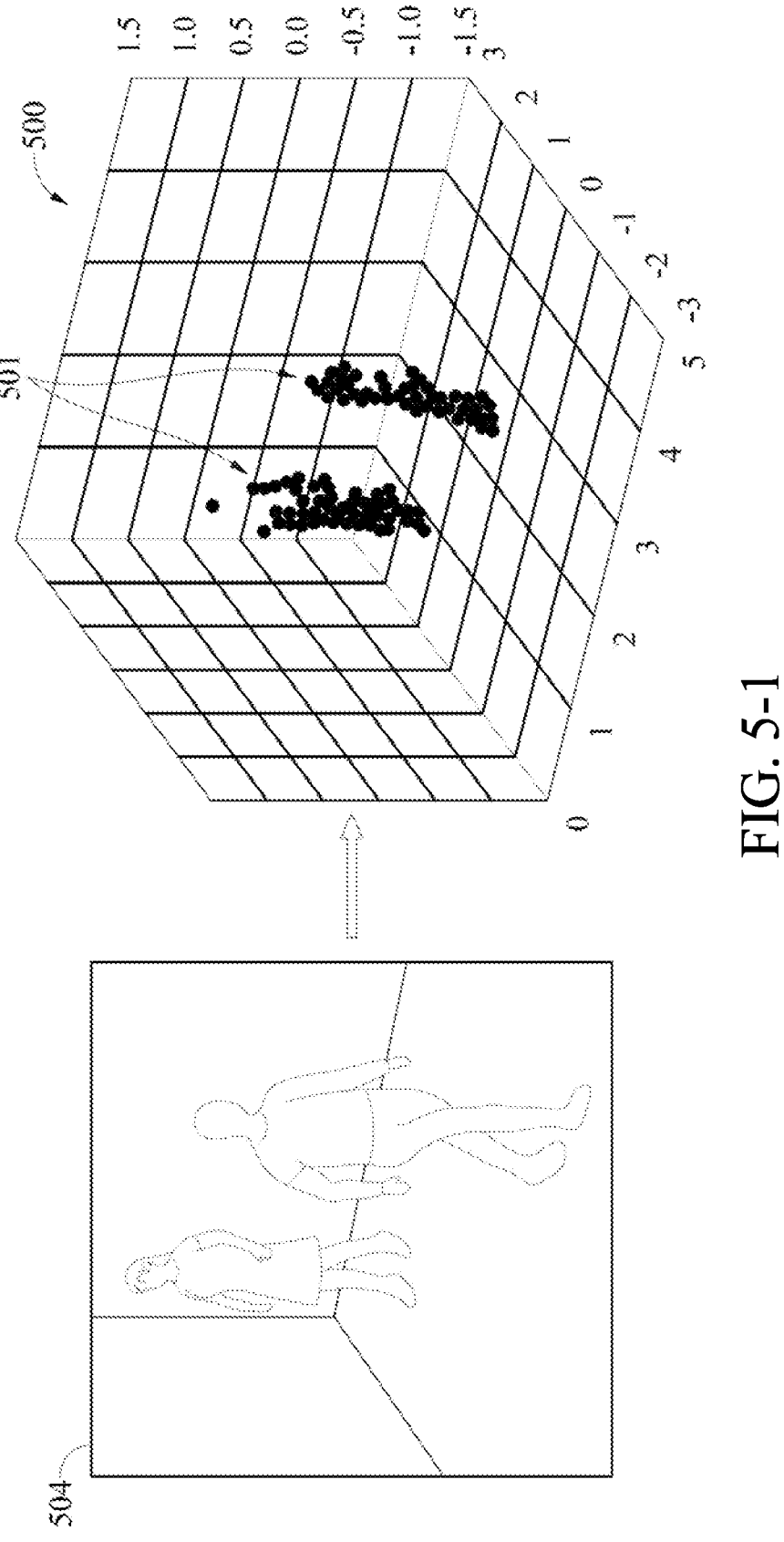
Figures 2, 5:
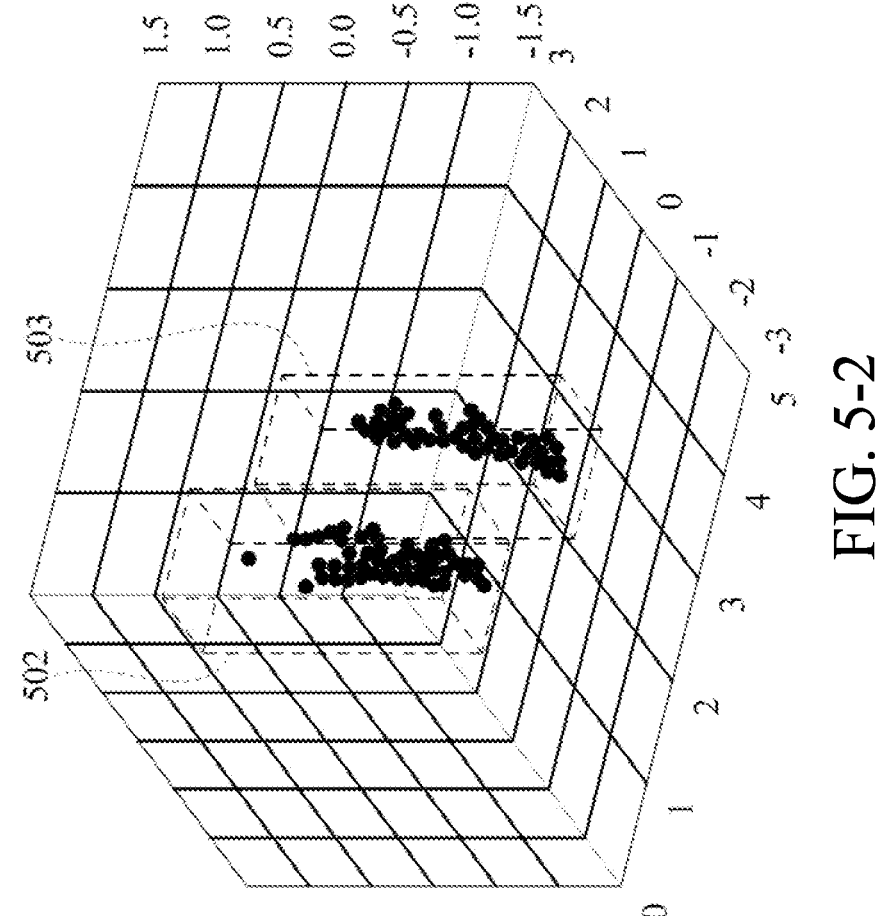
Figures 3, 5:
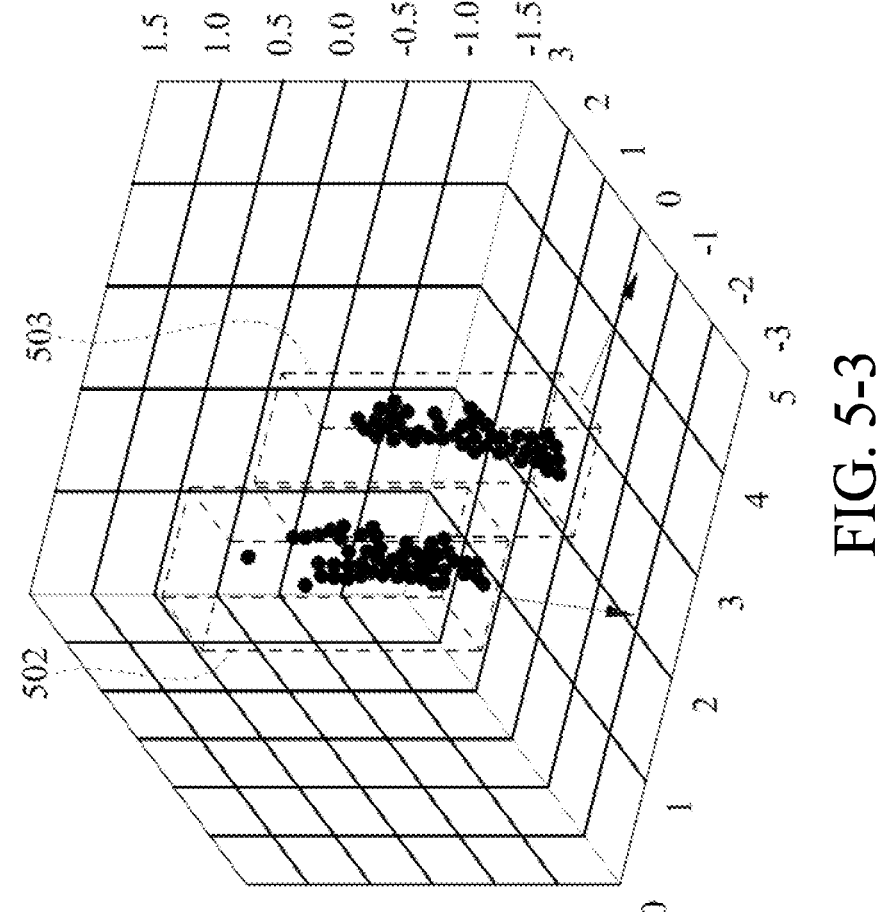

In the embodiments shown in FIG. 5-1 to FIG. 5-3, the processing unit 103 classifies the plurality of points 501 into an object cluster 502 and an object cluster 503 correspond- ing to the predetermined field of view currently being scanned. The processing unit 103 determines, according to the object cluster 502 and the object cluster 503, whether the tracked object is found through scanning in the predeter- mined field of view currently being scanned. Using the embodiment of FIG. 5-1 as an example, the processing unit 103 detects two tracked objects in the corresponding pre- determined field of view currently being scanned.

In some embodiments of the present invention, if there is no object cluster in the point cloud image 500 corresponding to the predetermined field of view currently being scanned, or a range of the classified object cluster is smaller than a preset value, the processing unit 103 determines that the tracked object is not found through scanning in the corre- sponding predetermined field of view currently being scanned.

In some embodiments of the present invention, the pro- cessing unit 103 determines, according to whether the object cluster 502 and the object cluster 503 have physiological characteristics such as heartbeats or breathing, whether the tracked object is found through scanning in the predeter- mined field of view currently being scanned. If the object cluster 502 and the object cluster 503 have physiological characteristics such as heartbeats or breathing, the process- ing unit 103 determines that the tracked object is found through scanning in the predetermined field of view cur- rently being scanned.

FIG. 16 illustrates a flowchart of generating a point cloud image according to an embodiment of the present invention. In this embodiment, the radio frequency signal is the fore- going linear frequency-modulated continuous wave signal, and as shown in FIG. 16, step S1501 further includes step S1601 to step S1604. In step S1601, the processing unit 103 performs range processing and Doppler processing on an original data block formed by the digital feedback signal to obtain a processed data block. The range processing includes a range fast Fourier transform (Range FFT), and the Doppler processing includes a Doppler fast Fourier transform (Dop- pler FFT). As described above, the demodulation unit 206 mixes and merges the frequency-modulated signal generated by the signal generator 204 and the feedback signal ampli- fied and filtered by the receive unit 205, filters out a high frequency signal, to generate an intermediate frequency (IF) signal. The intermediate frequency signal is converted into a digital signal by an analog-to-digital converter. To detect objects in different ranges (distances), fast Fourier transform processing is performed on the digital signal obtained after the conversion of the intermediate frequency signal, and each processed peak represents an object at a corresponding distance, which is referred to as range fast Fourier transform. For a target of interest, the range fast Fourier transform can be repeatedly performed until data is enough for perform a second-level fast Fourier transform. A result of the second- level fast Fourier transform is a two-dimensional complex- valued matrix of which a peak corresponds to a Doppler frequency shift of a moving target. The method is referred to as Doppler fast Fourier transform.

In step S1602, the processing unit 103 performs moving target indication (MTI) on the processed data block to remove a stationary point in the processed data block. In step S1603, after step S1602, the processing unit 103 removes, by using a detection algorithm, a point generated by a noisy background in the processed data block.

It should be noted that, in some embodiments of the present invention, the foregoing detection algorithm is a constant false alarm rate (CFAR) algorithm. In other embodiments of the present invention, one is selected from a group consisting of a cell-averaging CFAR (CA-CFAR) algorithm, a greatest-of-cell-average CFAR (GOCA-CFAR) algorithm, a smallest-of-cell-average CFAR (SOCA-CFAR) algorithm, and an ordered statistic CFAR (OS-CFAR) algo- rithm as the detection algorithm.

In step S1604, after step S1603, angle processing is performed on the processed data block to generate the point cloud image 500 shown in FIG. 5-1. The angle processing includes an angle fast Fourier transform (Angle FFT). The range fast Fourier transform and Doppler fast Fourier trans- form do not work when there are two objects that are equidistant and have the same velocity relative to the radar scanning system 100. Then, it is necessary to estimate the angle of arrival (AoA). Because the distances between the object and antennas are different, the angle of arrival is estimated based on a phasor variation of a peak of the range fast Fourier transform or the Doppler fast Fourier transform, which requires at least two receive antennas. Likewise, the angle estimation problem can be resolved by performing fast Fourier transform on the phasor sequence corresponding to the peaks of the two-dimensional fast Fourier transform (range fast Fourier transform and Doppler fast Fourier transform). The method is referred to as angle fast Fourier transform.

In some embodiments of the present invention, the clus- tering algorithm in step S1502 is a density-based spatial clustering of applications with noise algorithm (DBSCAN). In some embodiments of the present invention, a metric of the foregoing density-based spatial clustering of applica- tions with noise algorithm is described below in Equation 1, to reduce the contribution of a vertical z-axis (vertical axis) in the clustering:

$$D(p,q)=(p_x-q_x)^2+(p_y-q_y)^2+\alpha^*(p_z-q_z)^2 \qquad \text{(Equation 1)}$$

where $\alpha$ is a real value less than 1, $p_x$ and $q_x$ are x-coordinates of points p and q, respectively, $p_y$ and $q_y$ are y-coordinates of points p and q, respectively, and $p_z$ and $q_z$ are z-coordinates of points p and q, respectively. In some embodiments of the present invention, 0.05 is selected as a, and in some embodiments of the present invention, 0.25 is selected as $\alpha$.

In some embodiments of the present invention, a peak grouping algorithm, a modified density-based spatial clus- tering of applications with noise (modified DBSCAN) algo- rithm, or a hierarchical density-based spatial clustering of applications with noise (HDBSCAN) algorithm is selected as the clustering algorithm.

In some embodiments of the present invention, the posi- tion of each object cluster is determined by a physical center of the object cluster. In some embodiments of the present invention, the foregoing physical center of the object cluster is a centroid of a plurality of corresponding point clouds of the object cluster. In some embodiments of the present invention, as shown in FIG. 5-2, each object cluster includes an outer frame, and the processing unit 103 determines a position of the each object cluster by using a center point of the outer frame of the each object cluster as a physical center of the each object cluster. The processing unit 103 further uses the position of the object cluster as the coordinates of the tracked object recorded in step S1401.

In some embodiments of the present invention, the foregoing outer frame is rectangular. In some embodiments of the present invention, the foregoing outer frame is circular. In some embodiments of the present invention, the foregoing outer frame is elliptical.

It should be noted that, in the foregoing embodiments, the radar scanning system 100 periodically radiates a linear frequency modulation signal to scan a detection region (the schematic diagram 504 of the detection region in FIG. 5-1), and obtain a feedback signal. The radar scanning system 100 may also use a frequency-fixed continuous wave signal to scan the detection region (the schematic diagram 504 of the detection region in FIG. 5-1) and obtain a feedback signal. The processing unit 103 performs Doppler processing and angle processing on an original data block formed by the digital feedback signal to generate a two-dimensional point cloud image. The processing unit 103 further performs cluster analysis on the two-dimensional point cloud image according to a clustering algorithm to classify points in the two-dimensional point cloud image into at least one object cluster corresponding to the predetermined field of view currently being scanned.

Referring to FIG. 9 and FIG. 14, in some embodiments of the present invention, the preferential field of view in step S1401 includes a field of view in which the tracked object scanned is found through scanning in the predetermined fields of view. The scanning and processing policy of step S1402 includes scanning the preferential field of view a predetermined number of times.

For example, in step S1401, the processing unit 103 uses the foregoing nine current fields of view corresponding to the planes 8011 to 8019 as predetermined fields of view, and scans the nine current fields of view sequentially in an order of the plane 8011, the plane 8012, the plane 8013, the plane 8014, the plane 8015, the plane 8016, the plane 8017, the plane 8018, and the plane 8019. In this embodiment, the processing unit 103 finds the tracked object through scanning in the predetermined fields of view corresponding to the plane 8011, the plane 8015, and the plane 8019. The tracked objects include an object 802, an object 803, and an object 804. The processing unit 103 records coordinates of the object 802, the object 803, and the object 804, and sets predetermined fields of view corresponding to the plane 8011, the plane 8015 and the plane 8019 as preferential fields of view.

In step S1402, the processing unit 103 creates a scan list, and adds the predetermined fields of view corresponding to the plane 8011, the plane 8015, and the plane 8019 to the scan list. The processing unit 103 further scans the preferential fields of view a predetermined number of times (for example, twice).

In the foregoing embodiment, the scanning order of the processing unit 103 in the foregoing scanning round is: plane 8011→plane 8012→plane 8013→plane 8014→plane 8015→plane 8016→plane 8017→plane 8018→plane 8019→plane 8011→plane 8015→plane 8019→plane 8011→plane 8015→plane 8019.

It should be noted that, the predetermined number of times can be set according to actual needs, and is not necessarily 2. In the foregoing embodiments, although the nine predetermined fields of view are scanned in an order of plane 8011→plane 8012→plane 8013→plane 8014→plane 8015→plane 8016→plane 8017→plane 8018→plane 8019, the nine predetermined fields of view may certainly be scanned in another order, for example, the plane 8011→plane 8014→plane 8017→plane 8012→plane 8015→plane 8018→plane 8013→plane 8016→plane 8019. The present invention is not limited to this.

Figure 10:
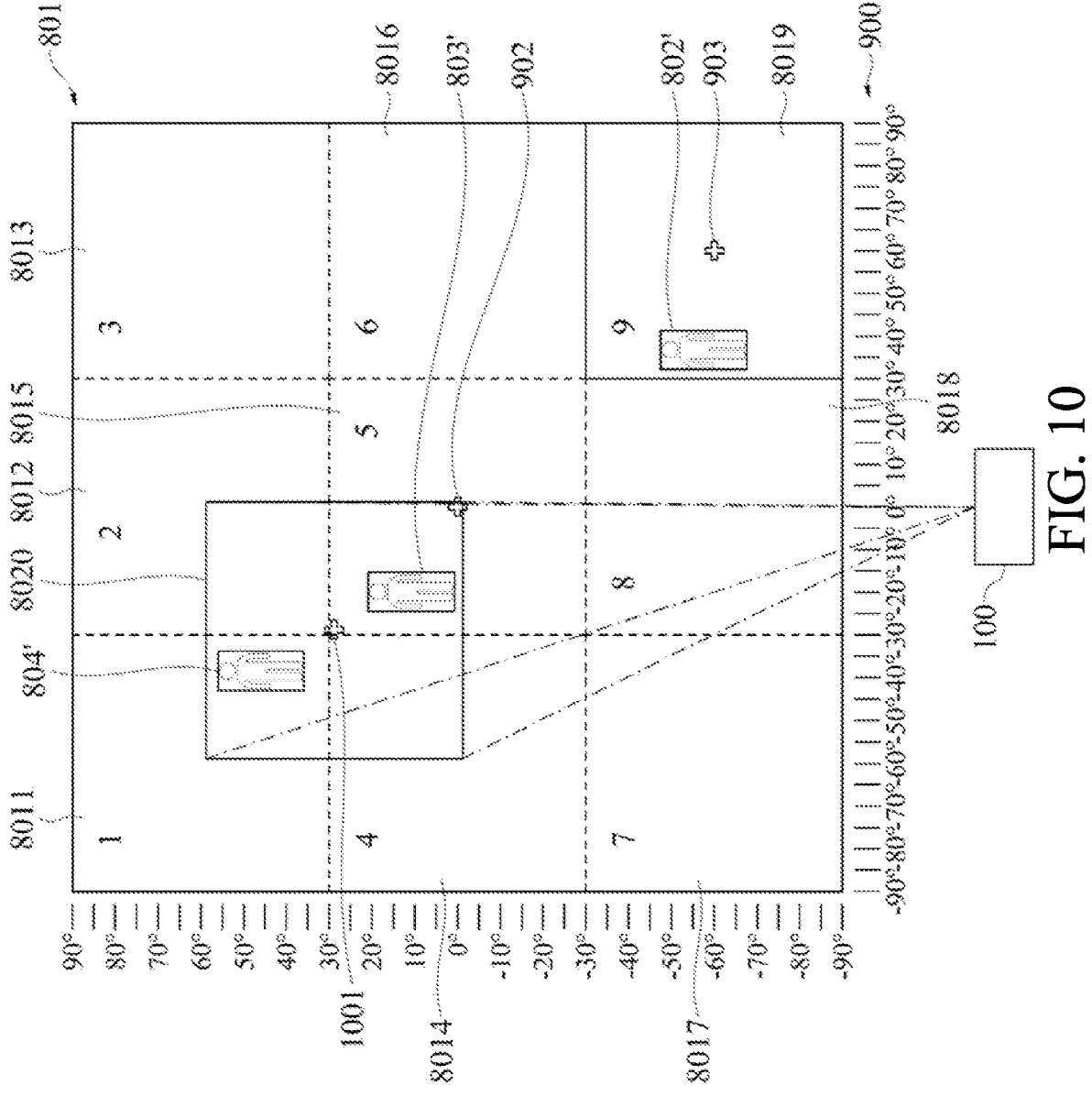
FIG. 10 illustrates a schematic diagram of a new field of view according to an embodiment of the present invention.

FIG. 10 illustrates a schematic diagram of a new field of view according to an embodiment of the present invention. FIG. 17 illustrates a flowchart of a scanning method according to some embodiments of the present invention. Referring to FIG. 10, FIG. 14, and FIG. 17 together, in some embodiments of the present invention, step S1401 includes step S1701 and step S1702. Step S1701: The processing unit 103 establishes, in response to that the tracked object includes two objects between which a distance is less than a preset distance, a new field of view based on a field of view range of the radar unit 105, to cause the new field of view to cover the two objects. In step S1702, the processing unit 103 sets the new field of view as one of the preferential fields of view.

In some embodiments, the foregoing preset distance is the size of the field of view range of the radar unit 105.

Descriptions are provided below by using FIG. 10 as an example. The processing unit 103 uses the foregoing nine current fields of view corresponding to the plane 8011 to the plane 8019 as predetermined fields of view, and scans the nine current fields of view sequentially in an order of the plane 8011, the plane 8012, the plane 8013, the plane 8014, the plane 8015, the plane 8016, the plane 8017, the plane 8018, and the plane 8019. The processing unit 103 finds the tracked object through scanning in the predetermined fields of view corresponding to the plane 8011, the plane 8015 and the plane 8019. The tracked objects include an object 802, an object 803, and an object 804. In step S1701, the processing unit 103 converts the coordinates of the object 802 and the object 803 into coordinates in the total field of view coordinate system 900. Based on the coordinates of the object 802 and the object 803 in the total field of view coordinate system 900, the processing unit 103 determines that a distance between the object 802 and the object 803 is smaller than the size of the field of view range of the radar unit 105. Therefore, the processing unit 103 creates a new field of view 8020 to cover the object 803 and the object 804. The new field of view 8020 has a center point 1001. In step S1702, the processing unit 103 sets the new field of view 8020 as one of the preferential fields of view.

In this embodiment, when the processing unit 103 performs step S1401, the processing unit 103 does not set the predetermined fields of view corresponding to the plane 8011 and the plane 8015 as preferential fields of view because the new field of view 8020 has already covered the object 803 and the object 804. The processing unit 103 sets the predetermined field of view corresponding to the plane 8019 as one of the preferential fields of view. Therefore, the preferential fields of view include the new field of view 8020 and the predetermined field of view corresponding to the plane 8019. In step S1402, the processing unit 103 creates a scan list, and adds the new field of view 8020 and the predetermined field of view corresponding to the plane 8019 to the scan list. The processing unit 103 further scans the preferential fields of view a predetermined number of times (for example, twice).

In the foregoing embodiment, the scanning order of the processing unit 103 in the foregoing scanning round is: plane 8011→plane 8012→plane 8013→plane 8014→plane 8015→plane 8016→plane 8017→plane 8018→plane 8019→new field of view 8020→plane 8019→new field of view 8020→plane 8019.

Figure 11:
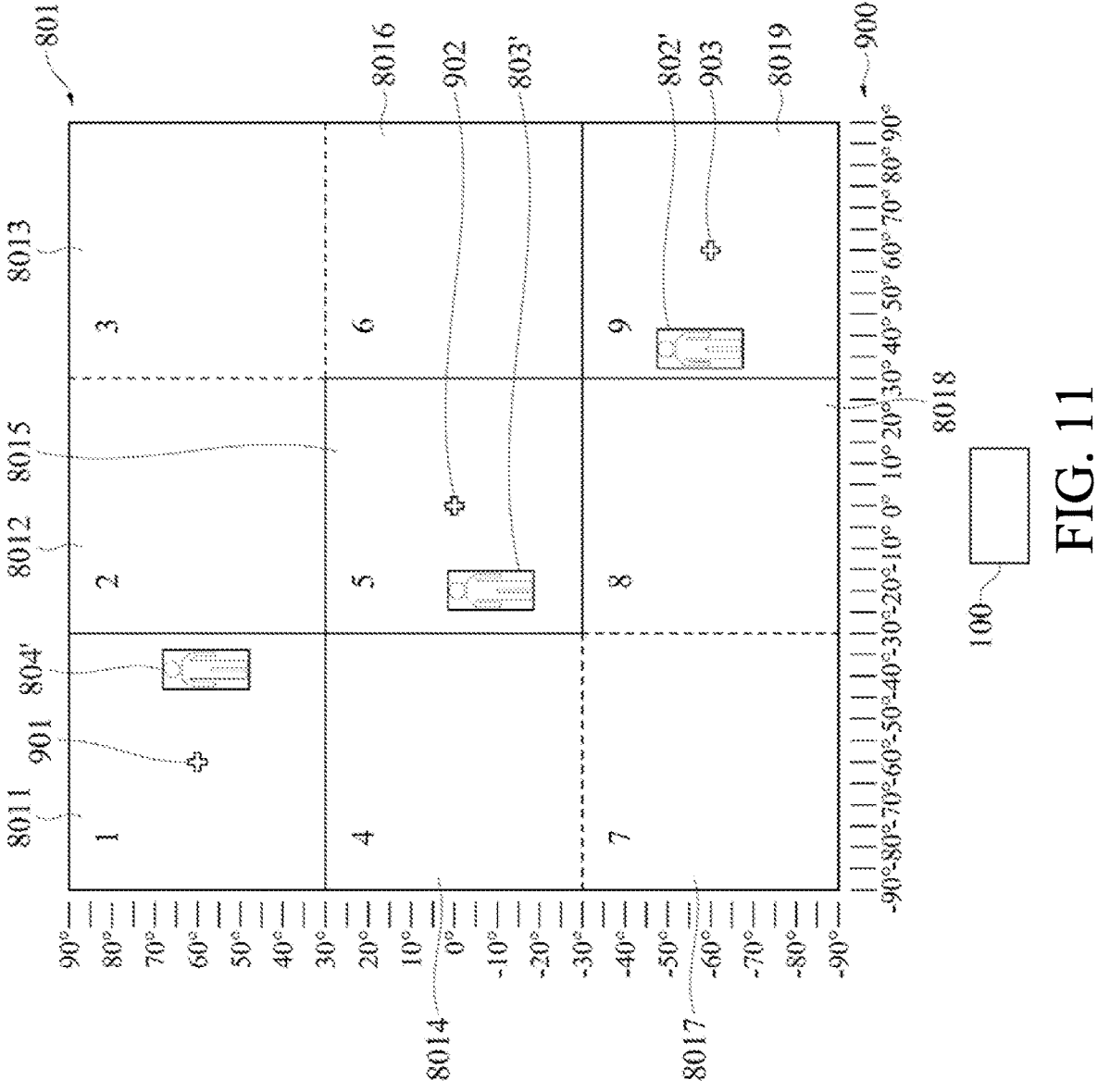
FIG. 11 illustrates a schematic diagram of a scanning and processing policy according to an embodiment of the present invention.

FIG. 11 illustrates a schematic diagram of a scanning and processing policy according to an embodiment of the present invention. Referring to FIG. 11 and FIG. 14, in some embodiments of the present invention, the preferential field of view in step S1401 includes a field of view in which the tracked object scanned is found through scanning in the predetermined fields of view. The scan list includes all predetermined fields of view. The scanning and processing policy includes that the predetermined fields of view are scanned, but the processing unit 103 only processes preferential field of view data of the preferential field of view. In some embodiments of the present invention, the preferential field of view data of the preferential field of view is a feedback signal corresponding to the preferential field of view.

Using FIG. 11 as an example, in step S1401, the processing unit 103 uses the foregoing nine current fields of view corresponding to the plane 8011 to the plane 8019 as predetermined fields of view, and scans the nine current fields of view sequentially in an order of the plane 8011, the plane 8012, the plane 8013, the plane 8014, the plane 8015, the plane 8016, the plane 8017, the plane 8018, and the plane 8019. In this embodiment, the processing unit 103 finds the tracked object through scanning in the predetermined fields of view corresponding to the plane 8011, the plane 8015, and the plane 8019. The tracked objects include an object 802, an object 803, and an object 804. The processing unit 103 records coordinates of the object 802, the object 803, and the object 804, and sets predetermined fields of view corresponding to the plane 8011, the plane 8015 and the plane 8019 as preferential fields of view.

In step S1402, the processing unit 103 uses the nine current fields of view corresponding to the plane 8011 to the plane 8019 as the scan list. That is, the processing unit 103 also sequentially scans the nine current fields of view corresponding to the plane 8011 to the plane 8019 the predetermined number of times (for example, twice), but during the two times of scanning, the processing unit 103 only processes the preferential field of view data of the preferential field of view without processing data that is not preferential field of view data. In the example of FIG. 8, the processing unit 103 only processes the preferential field of view data of the predetermined fields of view corresponding to the plane 8011, the plane 8015 and the plane 8019. The foregoing embodiment is applicable to a device with a fixed scanning order.

Figure 12:
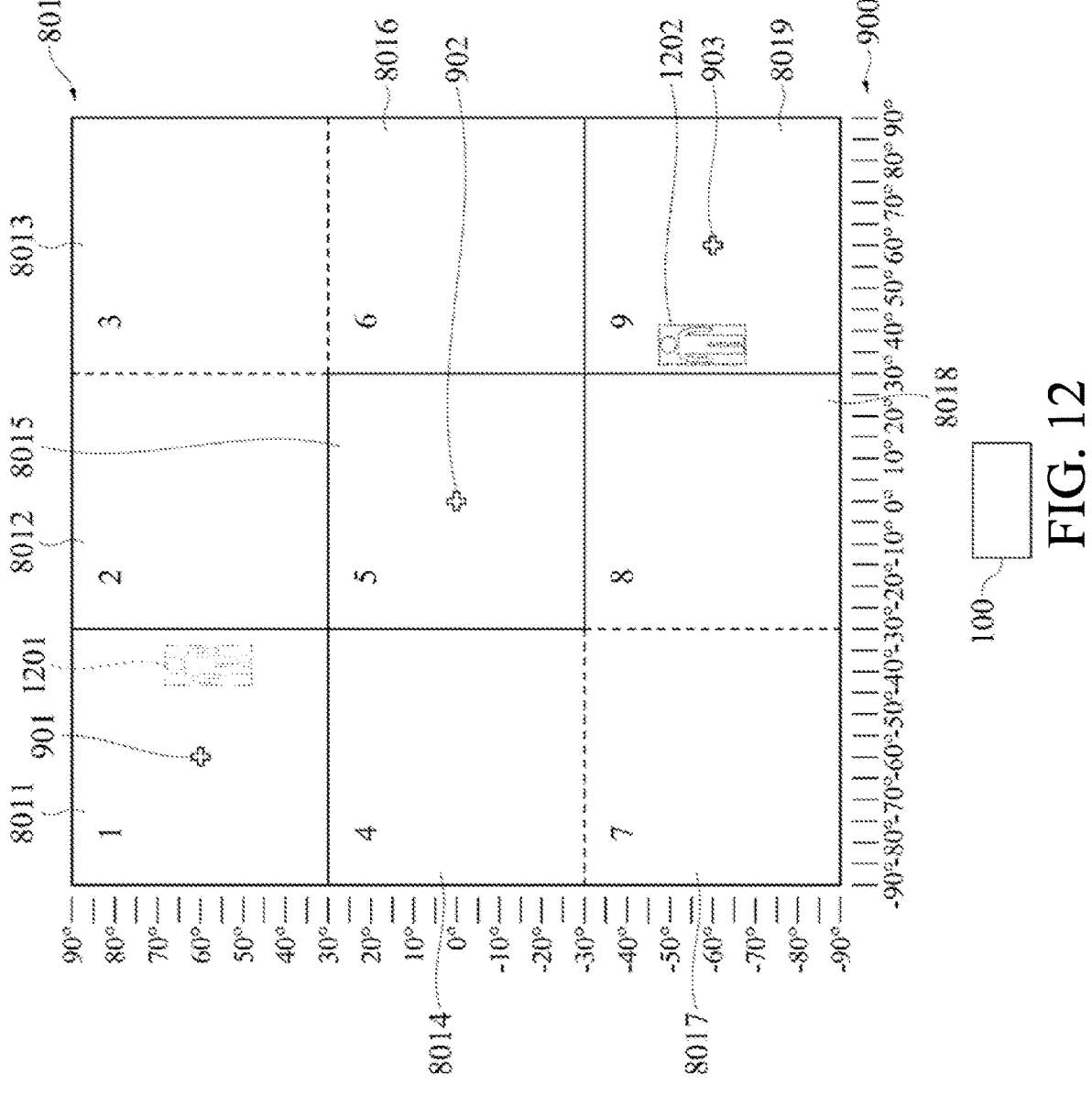
FIG. 12 illustrates a schematic diagram of a scanning and processing policy according to an embodiment of the present invention.

FIG. 12 illustrates a schematic diagram of a scanning and processing policy according to an embodiment of the present invention. FIG. 18 illustrates a flowchart of a scanning method according to some embodiments of the present invention. Referring to FIG. 12, FIG. 14, and FIG. 18 together, in this embodiment, step S1402 includes step S1801. In step S1801, the processing unit 103 sets, in response to that the tracked object is not found through scanning in the predetermined fields of view, the scan list to include an entrance-exit field of view. The foregoing scanning and processing policy includes scanning the entrance-exit field of view a predetermined number of times.

Using FIG. 12 as an example, in step S1401, the processing unit 103 uses the foregoing nine current fields of view corresponding to the plane 8011 to the plane 8019 as predetermined fields of view, and scans the nine current fields of view sequentially in an order of the plane 8011, the plane 8012, the plane 8013, the plane 8014, the plane 8015, the plane 8016, the plane 8017, the plane 8018, and the plane 8019. The processing unit 103 does not find the tracked object through scanning in the foregoing predetermined fields of view. Therefore, in step S1702, the processing unit 103 sets the scan list to include the entrance-exit field of view (a predetermined field of view corresponding to the plane 8011 and a predetermined field of view corresponding to the plane 8019), and the foregoing scanning and processing policy includes scanning the entrance-exit field of view a predetermined number of times (for example, twice).

The so-called entrance-exit field of view is a predetermined field of view that is in the predetermined fields of view (the nine predetermined fields of view corresponding to the plane 8011 to the plane 8019) and that is marked by the processing unit 103 as covering an object entrance-exit. The processing unit 103 can set the predetermined fields of view as entrance-exit fields of view when the system is set up. The processing unit 103 may also record, during scanning, a predetermined field of view in which an object changes from absence to presence or from presence to absence, as an entrance-exit field of view. Using FIG. 12 as an example, the processing unit 103 detects that an object 1201 changes from absence to presence in a field of view corresponding to the plane 8011, and an object 1202 changes from absence to presence in a field of view corresponding to the plane 8019. Therefore, the predetermined field of view corresponding to the plane 8011 and the predetermined field of view corresponding to the plane 8019 are recorded as entrance-exit fields of view.

In step S1402, the processing unit 103 creates a scan list, and adds the predetermined fields of view corresponding to the plane 8011 and the plane 8019 to the scan list. The processing unit 103 further scans the entrance-exit fields of view a predetermined number of times (for example, twice).

In this embodiment, the scanning order of the processing unit 103 in the foregoing scanning round is: plane 8011→plane 8012→plane 8013→plane 8014→plane 8015→plane 8016→plane 8017→plane 8018→plane 8019→plane 8011→plane 8019→plane 8011→plane 8019.

FIG. 19 illustrates a flowchart of a scanning method according to some embodiments of the present invention. Referring to FIG. 14 and FIG. 19 together, in this embodiment, step S1402 includes step S1901. In step S1901, the processing unit 103 sets, in response to finding the tracked object in the predetermined fields of view through scanning, the scan list to include an entrance-exit field of view. The foregoing scanning and processing policy includes scanning the preferential field of view and the entrance-exit field of view a predetermined number of times (for example, twice).

For example, in step S1401, the processing unit 103 uses the foregoing nine current fields of view corresponding to the planes 8011 to 8019 as predetermined fields of view, and scans the nine current fields of view sequentially in an order of the plane 8011, the plane 8012, the plane 8013, the plane 8014, the plane 8015, the plane 8016, the plane 8017, the plane 8018, and the plane 8019. In this embodiment, the processing unit 103 finds the tracked object through scanning in the predetermined fields of view corresponding to the plane 8011 and the plane 8015. The scanned tracked objects include the object 803 and the object 804. The processing unit 103 records coordinates of the object 803 and the object 804, and sets the predetermined fields of view corresponding to the plane 8011 and the plane 8015 as preferential fields of view.

The processing unit 103 records the predetermined field of view corresponding to the plane 8019 as the entrance-exit field of view. Therefore, in step S1402, the processing unit 103 creates a scan list, and adds the predetermined fields of view corresponding to the plane 8011, the plane 8015, and the plane 8019 to the scan list. The processing unit 103 further scans the preferential field of view and the entrance-exit field of view a predetermined number of times for example, twice).

Figure 13:
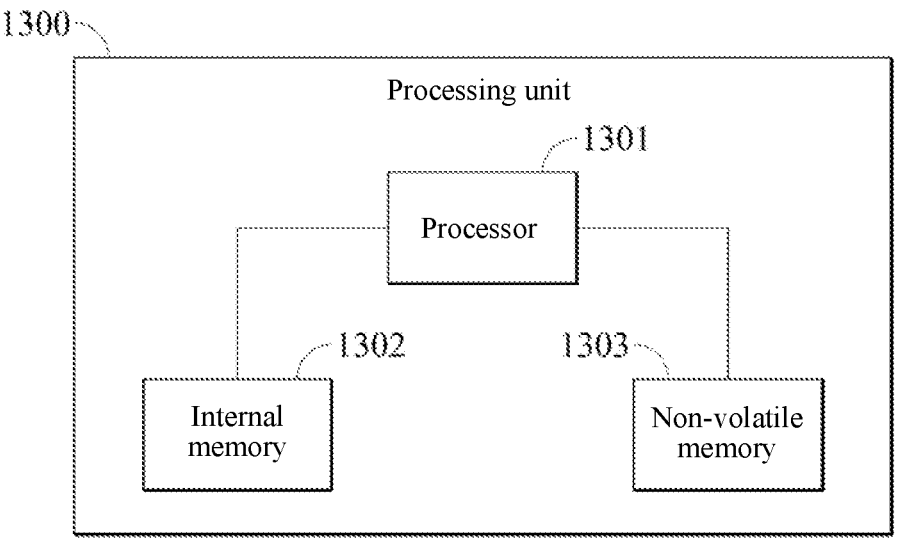
FIG. 13 illustrates a structural schematic diagram of a processing unit according to some embodiments of the present invention.

FIG. 13 is a structural schematic diagram of a processing unit 1300 according to some embodiments of the present invention. As shown in FIG. 13, at a hardware level, the processing unit 1300 includes a processor 1301, an internal memory 1302, and a non-volatile memory 1303. The internal memory 1302 is, for example, a random-access memory (RAM). Certainly, the processing unit 1300 may also include hardware required by other functions.

The internal memory 1302 and the non-volatile memory 1303 are configured to store programs. The programs may include program code, and the program code includes computer operation instructions. The internal memory 1302 and the non-volatile memory 1303 provide instructions and data for the processor 1301. The processor 1301 reads the corresponding computer program from the non-volatile memory 1303 into the internal memory 1302 and then executes the program. The processor 1301 is further configured to perform steps recorded in FIG. 14 to FIG. 19.

The processor 1301 may be an integrated circuit chip with a signal processing capability. In the implementation process, the methods and steps disclosed in the foregoing embodiments may be implemented through hardware integrated logic circuits or instructions in a form of software in the processor 1301. The processor 1301 may be a general-purpose processor, including a central processing unit (CPU), a tensor processing unit, a digital signal processor (DSP), an application-specific integrated circuit (ASIC), a field-programmable gate array (FPGA), or another programmable logic device, and can implement or execute the methods and steps disclosed in the foregoing embodiments.

In some embodiments of the present invention, a computer-readable recording medium storing a program is further provided. The computer-readable recording medium stores at least one instruction. The at least one instruction, when executed by the processor 1301 of the processing unit 1300, enables the processor 1301 of the processing unit 1300 to performs the steps recorded in FIG. 14 to FIG. 19.

Examples of storage media of the computer include, but are not limited to, a phase-change memory (PRAM), a static random access memory (SRAM), a dynamic random access memory (DRAM), another type of random access memory (RAM), a read-only memory (ROM), an electrically erasable programmable read-only memory (EEPROM), a flash memory or another internal memory technology, a compact disc read-only memory (CD-ROM), a digital versatile disc (DVD) or another optical memory, a magnetic tape cassette, a magnetic tape storage or another magnetic storage device, or any other non-transmission medium, which may be used to store information that can be accessed by a computing device. As defined herein, the computer-readable media does not include transitory media such as a modulated data signal and a carrier.

Based on the above, some embodiments of the present invention provide the radar scanning system, the scanning method, the computer-readable recording medium storing a program, and the non-transitory computer program product, to expand a detection range of the radar unit by integrating a plurality of fields of view of the radar unit, and improve a detection efficiency of the radar unit by scanning a specific region at a high frequency.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A radar scanning system, comprising:
   a radar unit for generating a radio frequency signal, radiating the radio frequency signal to a field of view of the radar unit, and receiving a feedback signal to scan the field of view; and
   a processing unit for performing the following steps in a scanning round:
   (a) sending a control signal to cause the radar unit to scan a plurality of predetermined fields of view of the radar unit sequentially in an order, recording, in response to finding at least one tracked object in the predetermined fields of view through scanning, coordinates of each of the at least one tracked object, and setting at least one preferential field of view based on the coordinates of the each of the at least one tracked object, wherein the plurality of predetermined fields of view of the radar unit constitute a total field of view of the radar unit; and
   (b) creating a scan list, wherein the scan list comprises the plurality of predetermined fields of view of the radar unit and an entrance-exit field of view, wherein the entrance-exit field of view is a first field of view that is in the predetermined fields of view and that is marked by the processing unit as covering an object entrance-exit, setting, in response to finding the at least one tracked object in the predetermined fields of view through scanning, the scan list to comprise the at least one preferential field of view, and controlling, based on the scan list and a scanning and processing policy, the radar unit to perform scanning to scan a plurality of fields of view in the scan list.

2. The radar scanning system according to claim 1, wherein the at least one preferential field of view comprises at least one first field of view of the at least one tracked object found through scanning in the predetermined fields of view, and the scanning and processing policy comprises scanning the at least one preferential field of view a predetermined number of times.

3. The radar scanning system according to claim 1, wherein step (a) comprises:
   creating, in response to that the at least one tracked object comprises two objects and a distance between the two objects is less than a preset distance, a new field of view based on a field of view range of the radar unit, to cause the new field of view to cover the two objects; and
   setting the new field of view as one of the at least one preferential field of view.

4. The radar scanning system according to claim 1, wherein the at least one preferential field of view comprises at least one first field of view of the at least one tracked object found through scanning in the predetermined fields of view, the scan list comprises the predetermined fields of view, and the scanning and processing policy comprises that the predetermined fields of view are scanned, but the processing unit only processes preferential field of view data corresponding to the at least one preferential field of view.

5. The radar scanning system according to claim 1, wherein step (b) comprises: setting, in response to that the at least one tracked object is not found through scanning in the predetermined fields of view, the scanning and processing policy comprises scanning the entrance-exit field of view a predetermined number of times.

6. The radar scanning system according to claim 1, wherein step (b) comprises: setting, in response to finding at least one tracked object in the predetermined fields of view through scanning, the scanning and processing policy comprises scanning the at least one preferential field of view and the entrance-exit field of view a predetermined number of times.

7. The radar scanning system according to claim 1, wherein step (a) comprises:

(a1) generating a point cloud image for the feedback signal of each of the predetermined fields of view; and (a2) performing, according to a clustering algorithm, cluster analysis on the point cloud image generated for the feedback signal of the each of the predetermined fields of view to determine whether the at least one tracked object is found through scanning in the predetermined fields of view.

8. The radar scanning system according to claim 7, wherein the radio frequency signal is a frequency-modulated continuous wave signal, and step (a1) comprises:

(a11) performing range processing and Doppler processing on an original data block formed by the feedback signal to obtain a processed data block;

(a12) performing moving target indication on the processed data block to remove a stationary point in the processed data block;

(a13) removing, after step (a12) by using a detection algorithm, a point generated by a noisy background in the processed data block; and (a14) performing, after step (a13), angle processing on the processed data block to generate the point cloud image.

9. The radar scanning system according to claim 1, comprising a pointing control unit for adjusting a field of view direction of the radar unit according to the control signal, wherein when the pointing control unit adjusts the radar unit, the field of view direction is maintained pointing to a center point of the field of view of the radar unit.

10. The radar scanning system according to claim 1, wherein the radar unit comprises an antenna unit and a front end unit, wherein the antenna unit is for radiating the radio frequency signal to free space and receiving the feedback signal, and the front end unit is for generating the radio frequency signal, and demodulating and digitizing the feedback signal to obtain a digital feedback signal.

11. A scanning method, applicable to a radar scanning system and executable by a processing unit, wherein the radar scanning system comprises a radar unit for generating a radio frequency signal, radiating the radio frequency signal to a field of view of the radar unit, and receiving a feedback signal to scan the field of view; and the processing unit; and the scanning method comprises:

performing the following steps in a scanning round:

(a) sending a control signal to cause the radar unit to scan a plurality of predetermined fields of view of the radar unit sequentially in an order, recording, in response to finding at least one tracked object in the predetermined fields of view through scanning, coordinates of each of the at least one tracked object, and setting at least one preferential field of view based on the coordinates of the each of the at least one tracked object, wherein the plurality of predetermined fields of view of the radar unit constitute a total field of view of the radar unit; and (b) creating a scan list, wherein the scan list comprises the plurality of predetermined fields of view of the radar unit and an entrance-exit field of view, wherein the entrance-exit field of view is a first field of view that is in the predetermined fields of view and that is marked by the processing unit as covering an object entrance-exit, setting, in response to finding the at least one tracked object in the predetermined fields of view through scanning, the scan list to comprise the at least one preferential field of view, and controlling, based on the scan list and a scanning and processing policy, the radar unit to perform scanning to scan a plurality of fields of view in the scan list.

12. The scanning method according to claim 11, wherein the at least one preferential field of view comprises at least one first field of view of the at least one tracked object found through scanning in the predetermined fields of view, and the scanning and processing policy comprises scanning the at least one preferential field of view a predetermined number of times.

13. The scanning method according to claim 11, wherein step (a) comprises:

creating, in response to that the at least one tracked object comprises two objects and a distance between the two objects is less than a preset distance, a new field of view based on a field of view range of the radar unit, to cause the new field of view to cover the two objects; and setting the new field of view as one of the at least one preferential field of view.

14. The scanning method according to claim 11, wherein the at least one preferential field of view comprises at least one first field of view of the at least one tracked object found through scanning in the predetermined fields of view, the scan list comprises the predetermined fields of view, and the scanning and processing policy comprises that the predetermined fields of view are scanned, but the processing unit only processes preferential field of view data corresponding to the at least one preferential field of view.

15. The scanning method according to claim 11, wherein step (b) comprises: setting, in response to that the at least one tracked object is not found through scanning in the predetermined fields of view, the scanning and processing policy comprises scanning the entrance-exit field of view a predetermined number of times.

16. The scanning method according to claim 11, wherein step (b) comprises: setting, in response to finding the at least one tracked object in the predetermined fields of view through scanning, the scanning and processing policy comprises scanning the at least one preferential field of view and the entrance-exit field of view a predetermined number of times.

17. The scanning method according to claim 11, wherein step (a) comprises:

(a1) generating a point cloud image for the feedback signal of each of the predetermined fields of view; and (a2) performing, according to a clustering algorithm, cluster analysis on the point cloud image generated for the feedback signal of the each of the predetermined fields of view to determine whether the at least one tracked object is found through scanning in the predetermined fields of view.

18. The scanning method according to claim 17, wherein one is selected from an algorithm group consisting of a free peak grouping algorithm, a density-based spatial clustering of applications with noise algorithm, a modified density-based spatial clustering of applications with noise algorithm, and a hierarchical density-based spatial clustering of applications with noise algorithm as the clustering algorithm.

19. The scanning method according to claim 17, wherein the radio frequency signal is a frequency-modulated continuous wave signal, and step (a1) comprises:

(a11) performing range processing and Doppler processing on an original data block formed by the feedback signal to obtain a processed data block;

(a12) performing moving target indication on the processed data block to remove a stationary point in the processed data block;

(a13) removing, after step (a12) by using a detection algorithm, a point generated by a noisy background in the processed data block; and (a14) performing, after step (a13), angle processing on the processed data block to generate the point cloud image.

20. The scanning method according to claim 19, wherein one is selected from a group consisting of a free constant false alarm rate, a cell-averaging constant false alarm rate, a greatest-of-cell-average constant false alarm rate, a smallest-of-cell-average constant false alarm rate, and an ordered statistic constant false alarm rate as the detection algorithm.

* * * * *